United States Patent
Chung et al.

(10) Patent No.: US 9,377,605 B2
(45) Date of Patent: Jun. 28, 2016

(54) WIDE ANGLE OPTICAL LENS SYSTEM

(71) Applicant: GLORY SCIENCE CO., LTD., Changhua Hsien (TW)

(72) Inventors: Feng-Chao Chung, Changhua Hsien (TW); Shih-Yuan Chang, Changhua Hsien (TW); Kun-Ti Liu, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 0 days.

(21) Appl. No.: 14/481,280

(22) Filed: Sep. 9, 2014

(65) Prior Publication Data

US 2015/0098135 A1    Apr. 9, 2015

Related U.S. Application Data

(60) Provisional application No. 61/886,351, filed on Oct. 3, 2013.

(51) Int. Cl.
| | |
|---|---|
| G02B 13/18 | (2006.01) |
| G02B 3/02 | (2006.01) |
| G02B 13/04 | (2006.01) |
| G02B 9/62 | (2006.01) |
| G02B 13/00 | (2006.01) |

(52) U.S. Cl.
CPC ........ *G02B 13/18* (2013.01); *G02B 9/62* (2013.01); *G02B 13/0045* (2013.01)

(58) Field of Classification Search
CPC .......... G02B 13/18; G02B 9/62; G02B 13/04; G02B 13/0045; G02B 13/0015; G02B 15/177; G02B 13/002; G02B 9/64; G02B 13/001

USPC ......................................... 359/713, 752, 761
See application file for complete search history.

(56) References Cited

U.S. PATENT DOCUMENTS

| 8,687,292 B2 | 4/2014 | Tsai et al. | |
|---|---|---|---|
| 8,699,150 B1 | 4/2014 | Hsieh et al. | |
| 2011/0249349 A1* | 10/2011 | Asami ................ | G02B 13/0045 359/797 |
| 2014/0029115 A1 | 1/2014 | Liao et al. | |
| 2014/0092491 A1* | 4/2014 | Hsu .................... | G02B 13/0045 359/761 |

FOREIGN PATENT DOCUMENTS

| TW | 201245758 A1 | 11/2012 |
|---|---|---|
| TW | 201303412 A1 | 1/2013 |
| TW | 201418764 A | 5/2014 |

\* cited by examiner

*Primary Examiner* — Alicia M Harrington
(74) *Attorney, Agent, or Firm* — Gemini Patent Services, Inc.

(57) ABSTRACT

A wide angle optical lens system includes an aperture stop and an optical assembly, the optical assembly includes, in order from the object side to the image side: a first lens element with a negative refractive power; a second lens element with a positive refractive power; a third lens element with a negative refractive power; a fourth lens element with a refractive power; a fifth lens element with a positive refractive power; a sixth lens element with a negative refractive power, wherein a focal length of the wide angle optical lens system is f, a focal length of the fifth lens element is f5, a radius of curvature of an object-side surface of the third lens element is R5, a radius of curvature of an image-side surface of the third lens element is R6, the following conditions are satisfied: $1.0 < f/f5 < 3.8$; $-3.5 < (R6+R5)/(R6-R5) < 0.6$.

15 Claims, 24 Drawing Sheets

WIDE ANGLE OPTICAL LENS SYSTEM

CROSS-REFERENCE TO RELATED APPLICATION

The present invention claims the benefit of U.S. Provisional Application 61/886,351, filed on Oct. 3, 2013.

BACKGROUND OF THE INVENTION

1. Field of the Invention

The present invention relates to a wide angle optical lens system, and more particularly to a miniaturized wide angle optical lens system applicable to electronic products.

2. Description of the Prior Art

In recent years, with the rapid development of portable electronic products, such as, smartphone, tablet computer and so on, small optical lens system applied to portable electronic products has been indispensable. In addition, as the advanced semiconductor manufacturing technologies have allowed the image sensors with smaller size and higher pixel, small optical lens systems have increasingly higher pixel, there's an increasing demand for an optical lens system with better image quality.

The optical lens systems disclosed in U.S. Pat. No. 8,699,150 and US Publication No. 20140029115 are all provided with five to six lens elements in order to provide wider angle of view and high image quality, however, the distortion is large and the total track length of these optical lens systems is also too long, which are not applicable to mobile devices. The optical lens systems disclosed in U.S. Pat. No. 8,687,292 and TW Application Nos. 101127138, 101136381 and 103102649 are capable of shooting by using a first lens element with a negative refractive power and four to five lens elements with refracting power, however, the angle of view is between 70 to 80 degrees, which cannot meet the requirement of wide-angle shooting of the current portable electronic products.

The present invention been made in order to solve the above-mentioned problems.

SUMMARY OF THE INVENTION

The primary objective of the present invention is to provide a miniaturized wide angle optical lens system having a wide field of view and high resolution.

According to one aspect of the present invention, a wide angle optical lens system comprises an aperture stop and an optical assembly, the optical assembly comprises, in order from the object side to the image side:

a first lens element with a negative refractive power having an aspheric object-side surface and an aspheric image-side surface, the first lens element being made of plastic material; a second lens element with a positive refractive power having an aspheric object-side surface and an aspheric image-side surface being convex near the optical axis, the second lens element being made of plastic material; a third lens element with a negative refractive power having an aspheric object-side surface and an aspheric image-side surface being concave near the optical axis, the third lens element being made of plastic material; a fourth lens element with a refractive power having an aspheric object-side surface being convex near the optical axis and an aspheric image-side surface, the fourth lens element being made of plastic material; a fifth lens element with a positive refractive power having an aspheric object-side surface and an aspheric image-side surface being convex near the optical axis, the fifth lens element being made of plastic material; a sixth lens element with a negative refractive power having an aspheric object-side surface being convex near the optical axis and an aspheric image-side surface being concave near the optical axis, the sixth lens element being made of plastic material, and more than one inflection point being formed on the object-side surface and the image-side surface of the sixth lens element.

Wherein the focal length of the wide angle optical lens system is f, the focal length of the fifth lens element is f5, the radius of curvature of the object-side surface of the third lens element is R5, the radius of curvature of the image-side surface of the third lens element is R6, and the following conditions are satisfied:

$$1.0 < f/f5 < 3.8;$$

$$-3.5 < (R6+R5)/(R6-R5) < 0.6.$$

If f/f5 satisfies the above condition, it will be favorable to reduce the back focal length of the wide angle optical lens system so as to maintain the objective of miniaturization of the wide angle optical lens system, and can correct the spherical aberration.

If (R6+R5)/(R6−R5) satisfies the above condition, the sensitivity of the optical lens system to tolerance can be reduced, increasing the production yield.

Preferably, half of the maximal field of view of the wide angle optical lens system is HFOV, and the following condition is satisfied: $0.7 < \tan(HFOV) < 1.3$, which can obtain wider field of view and larger shooting range.

Preferably, the central thickness of the fourth lens element is CT4, the central thickness of the fifth lens element is CT5, the focal length of the wide angle optical lens system is f, and the following condition is satisfied: $0.38 < (CT4+CT5)/f < 0.72$, it will be favorable to improve the light gathering ability at the image side and correct the aberrations caused by wide field of view.

Preferably, the central thickness of the second lens element is CT2, the central thickness of the third lens element is CT3, the distance along an optical axis between the second lens element and the third lens element is T23, the distance from the object-side surface of the first lens element to the image plane along the optical axis is TTL, and the following condition is satisfied: $0.16 < (CT2+T23+CT3)/TTL < 0.24$, it can maintain the objective of miniaturization of the wide angle optical lens system and it is favorable to reduce the assembly tolerance.

Preferably, the object-side surface of the first lens element is convex near the optical axis, which can correct the peripheral aberrations within the optical lens system, expand the surrounding light cone size, and improve the peripheral resolution and relative illumination.

Preferably, the parallel distance from the point between the position of the maximum effective diameter of the image-side surface of the fifth lens element and the position of the maximum effective diameter of the object-side surface of the sixth lens element to the optical axis is ET56, and the following condition is satisfied: $0.26 < ET56 < 0.83$, it can further control the peripheral field curvature of the optical lens system and it will be favorable to assemble the lens elements.

Preferably, the Abbe number of the fourth lens element is V4, the Abbe number of the sixth lens element is V6, and the following condition is satisfied: $0.27 < V6/V4 < 0.7$, which will be favorable to correct the chromatic aberration of the optical lens system.

Preferably, the distance from the aperture stop to the image-side surface of the second lens element along the optical axis is SL2, the distance from the object-side surface of the first lens element to the image-side surface of the second lens element along the optical axis is TL2, and the following condition is satisfied: 0.3<SL2/TL2<1.1, which can adjust the incident angle of the light with respect to the image sensor that is disposed on the image plane, so as to improve the peripheral dark environment.

Preferably, the distance from the object-side surface of the first lens element to the image plane along the optical axis is TTL, half of the maximum diagonal imaging height of the wide angle optical lens system is ImgH, and the following condition is satisfied: TTL/ImgH<1.85, it can maintain the objective of miniaturization of the optical lens system, so as to be used in light-weight portable electronic products.

According to another aspect of the present invention, a wide angle optical lens system comprises an aperture stop and an optical assembly, the optical assembly comprises, in order from the object side to the image side:

a first lens element with a negative refractive power having an aspheric object-side surface being convex near the optical axis and an aspheric image-side surface, the first lens element being made of plastic material; a second lens element with a positive refractive power having an aspheric object-side surface being convex near the optical axis and an aspheric image-side surface being convex near the optical axis; a third lens element with a negative refractive power having an aspheric object-side surface and an aspheric image-side surface being concave near the optical axis, the third lens element being made of plastic material; a fourth lens element with a refractive power having an aspheric object-side surface being convex near the optical axis and an aspheric image-side surface, the fourth lens element being made of plastic material; a fifth lens element with a positive refractive power having an aspheric object-side surface and an aspheric image-side surface being convex near the optical axis, the fifth lens element being made of plastic material; a sixth lens element with a negative refractive power having an aspheric object-side surface being convex near the optical axis and an aspheric image-side surface being concave near the optical axis, the sixth lens element being made of plastic material, and more than one inflection point being formed on the object-side surface and the image-side surface of the sixth lens element.

Wherein the focal length of the wide angle optical lens system is f, the focal length of the fifth lens element is f5, the distance along an optical axis between the third lens element and the fourth lens element is T34, the distance along the optical axis between the fourth lens element and the fifth lens element is T45, the distance along the optical axis between the fifth lens element and the sixth lens element is T56, and the following conditions are satisfied:

$1.2 < f/f5 < 3.8;$ $T45 > T34 > T56.$

If f/f5 satisfies the above condition, it will be favorable to reduce the back focal length of the wide angle optical lens system so as to maintain the objective of miniaturization of the wide angle optical lens system, and can correct the spherical aberration.

If T45, T34 and T56 satisfy the above condition, it will be favorable to control the back focal length of the wide angle optical lens system.

Preferably, the radius of curvature of the object-side surface of the third lens element is R5, the radius of curvature of the image-side surface of the third lens element is R6, and the following condition is satisfied: −3.2<(R6+R5)/(R6−R5) <0.6, the sensitivity of the optical lens system to tolerance can be reduced, increasing the production yield.

Preferably, the central thickness of the second lens element is CT2, the central thickness of the third lens element is CT3, the distance along an optical axis between the second lens element and the third lens element is T23, the distance from the object-side surface of the first lens element to the image plane along the optical axis is TTL, and the following condition is satisfied: 0.18<(CT2+T23+CT3)/TTL<0.22, it can maintain the objective of miniaturization of the wide angle optical lens system and it is favorable to reduce the assembly tolerance.

Preferably, the image-side surface of the first lens element is concave near the optical axis, and the object-side surface of the first lens element is convex near the optical axis, so that the main refractive power of the wide angle optical lens system can be distributed evenly. The object-side surface of the fifth lens element is concave near the optical axis, it will be favorable to reduce the peripheral astigmatism and distortion.

Preferably, the focal length of the wide angle optical lens system is f, the focal length of the fifth lens element is f5, and the following condition is satisfied: 1.2<f/f5<3.2, which will be favorable to reduce the back focal length of the wide angle optical lens system so as to maintain the objective of miniaturization of the wide angle optical lens system, and can correct the spherical aberration.

Preferably, the focal length of the wide angle optical lens system is f, the radius of curvature of the image-side surface of the fifth lens element is R10, and the following condition is satisfied: −0.45<R10/f<−0.05, so that the incident angle of the off axis light with respect to the image sensor that is disposed on the image plane cannot be effectively suppressed, and the field curvature can be adjusted.

Preferably, the central thickness of the fifth lens element is CT5, which has the thickest thickness among the central thicknesses of the first to sixth lens elements, it can further reduce the back focal length of the wide angle optical lens system, balance the focal length of the fifth lens element and reduce the generation of aberrations.

Preferably, the distance from the aperture stop to the image-side surface of the second lens element along the optical axis is SL2, the distance from the object-side surface of the first lens element to the image-side surface of the second lens element along the optical axis is TL2, and the following condition is satisfied: 0.35<SL2/TL2<1.0, which can adjust the incident angle of the light with respect to the image sensor that is disposed on the image plane, so as to improve the peripheral dark environment.

Preferably, the distance from the object-side surface of the first lens element to the image plane along the optical axis is TTL, half of the maximum diagonal imaging height of the wide angle optical lens system is ImgH, and the following condition is satisfied: TTL/ImgH<1.85, it can maintain the objective of miniaturization of the optical lens system, so as to be used in light-weight portable electronic products.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
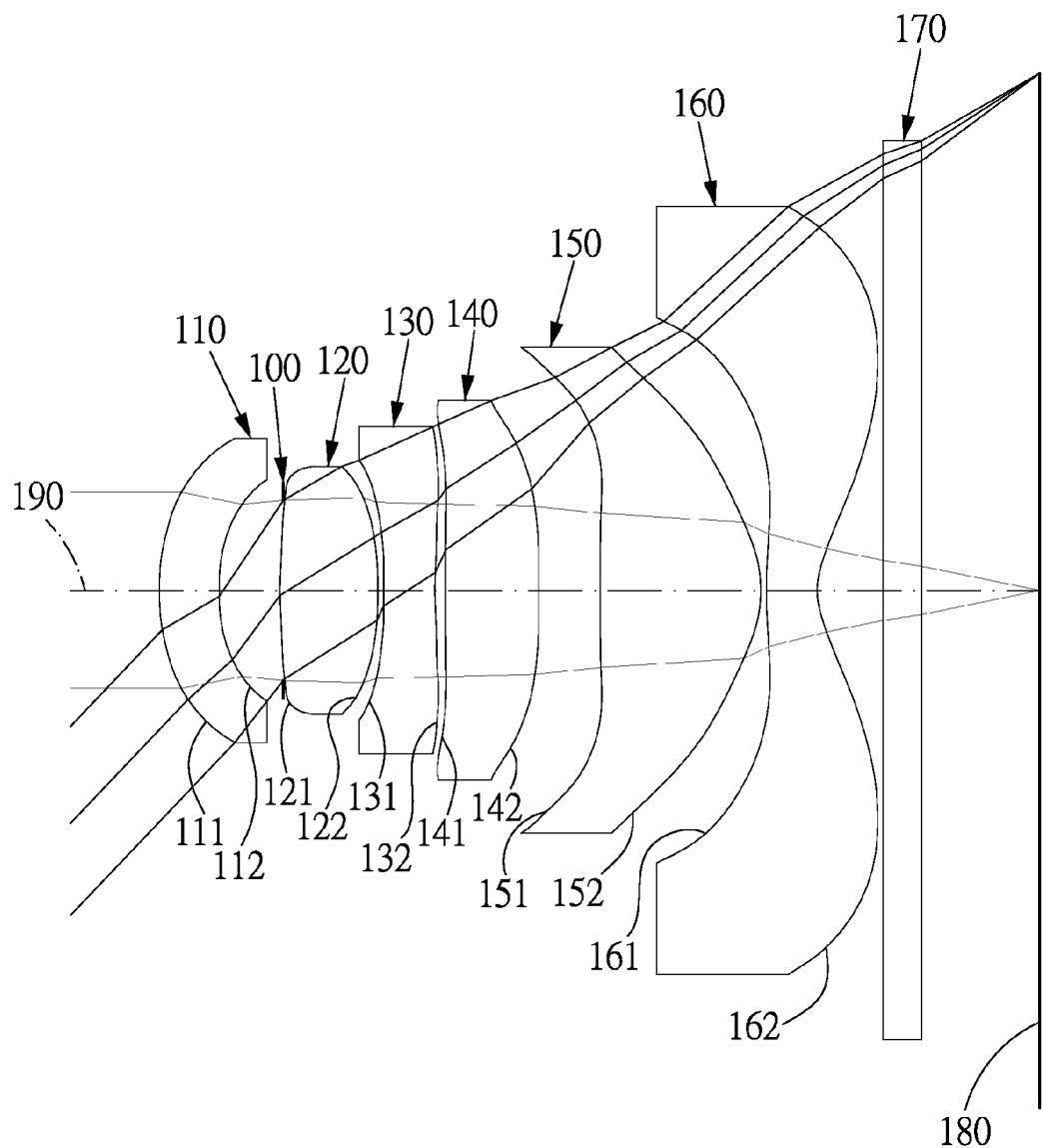
FIG. 1A shows a wide angle optical lens system in accordance with a first embodiment of the present invention.
Figure 1B:
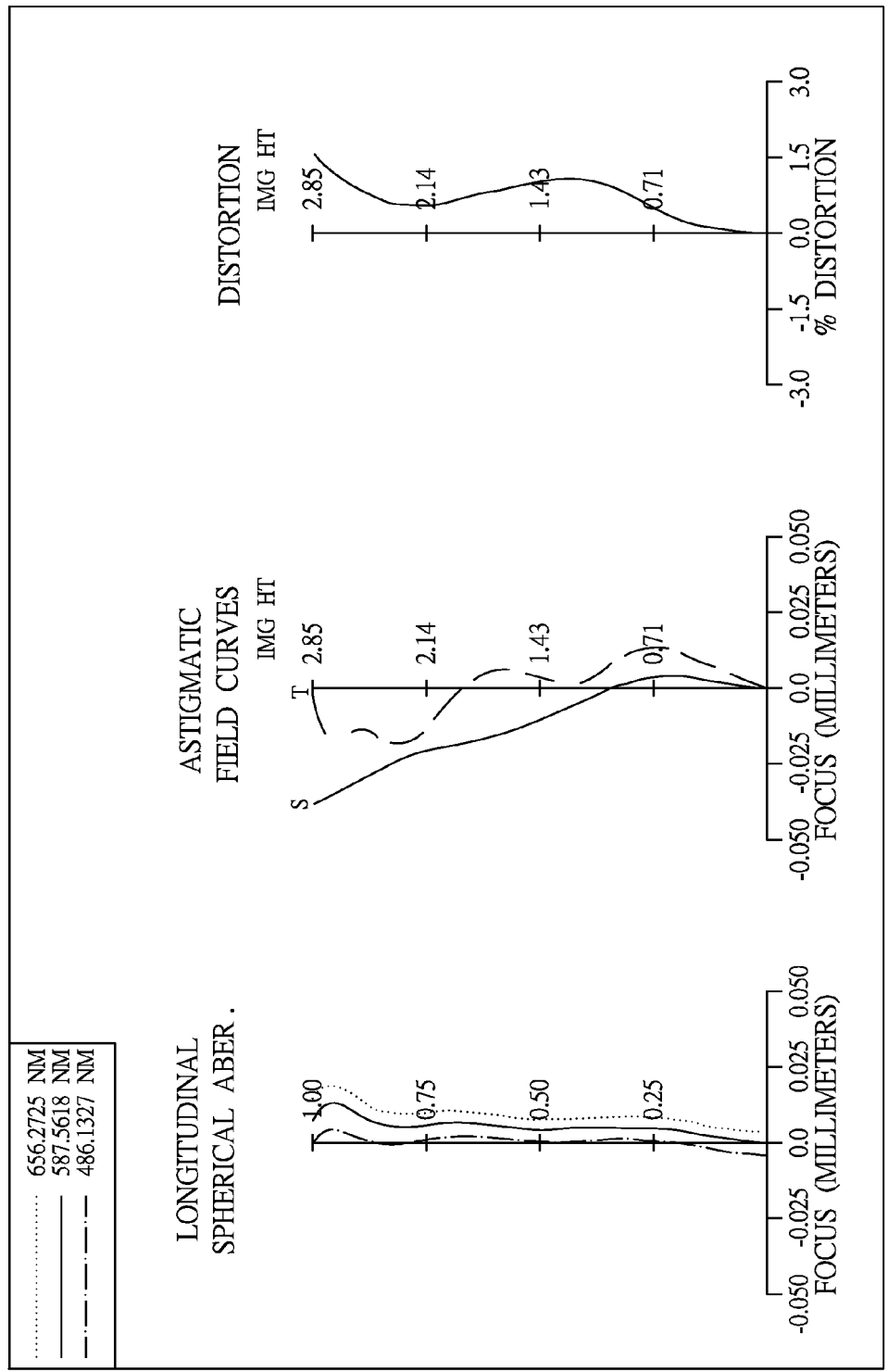
FIG. 1B shows the longitudinal spherical aberration curve, the astigmatic field curve and the distortion curve of the first embodiment of the present invention.

FIG. 1A shows a wide angle optical lens system in accordance with a first embodiment of the present invention, and FIG. 1B shows, in order from left to right, the longitudinal spherical aberration curves, the astigmatic field curves, and the distortion curve of the first embodiment of the present invention. A wide angle optical lens system in accordance with the first embodiment of the present invention comprises an aperture stop 100 and an optical assembly. The optical assembly comprises, in order from an object side to an image side: a first lens element 110, a second lens element 120, a third lens element 130, a fourth lens element 140, a fifth lens element 150, a sixth lens element 160, an IR cut filter 170 and an image plane 180, wherein the wide angle optical lens system has a total of six lens elements with refractive power. The aperture stop 100 is located between an image-side surface 112 of the first lens element 110 and an image-side surface 122 of the second lens element 120.

The first lens element 110 with a negative refractive power has an object-side surface 111 being convex near an optical axis 190 and the image-side surface 112 being concave near the optical axis 190, both the object-side and image-side surfaces 111, 112 are aspheric, and the first lens element 110 is made of plastic material.

The second lens element 120 with a positive refractive power has an object-side surface 121 being convex near the optical axis 190 and the image-side surface 122 being convex near the optical axis 190, both the object-side and image-side surfaces 121, 122 are aspheric, and the second lens element 120 is made of plastic material.

The third lens element 130 with a negative refractive power has an object-side surface 131 being concave near the optical axis 190 and an image-side surface 132 being concave near the optical axis 190, both the object-side and image-side surfaces 131, 132 are aspheric, and the third lens element 130 is made of plastic material.

The fourth lens element 140 with a positive refractive power has an object-side surface 141 being convex near the optical axis 190 and an image-side surface 142 being convex near the optical axis 190, both the object-side and image-side surfaces 141, 142 are aspheric, and the fourth lens element 140 is made of plastic material.

The fifth lens element 150 with a positive refractive power has an object-side surface 151 being convex near the optical axis 190 and an image-side surface 152 being convex near the optical axis 190, both the object-side and image-side surfaces 151, 152 are aspheric, and the fifth lens element 150 is made of plastic material.

The sixth lens element 160 with a negative refractive power has an object-side surface 161 being convex near the optical axis 190 and an image-side surface 162 being concave near the optical axis 190, both the object-side and image-side surfaces 161, 162 are aspheric, the sixth lens element 160 is made of plastic material, and more than one inflection point is formed on the object-side surface 161 and the image-side surface 162 of the sixth lens element 160.

The IR cut filter 170 made of glass is located between the sixth lens element 160 and the image plane 180 and has no influence on the focal length of the wide angle optical lens system.

The equation for the aspheric surface profiles of the first embodiment is expressed as follows:

$$z(h) = \frac{ch^2}{1 + \sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis 190 relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis 190;

k represents the conic constant;

$A_4, A_6, A_8, A_{10}, A_{12}, A_{14} \ldots$: represent the high-order aspheric coefficients.

In the first embodiment of the present wide angle optical lens system, the focal length of the wide angle optical lens system is f, the f-number of the wide angle optical lens system is Fno, half of the maximal field of view of the wide angle optical lens system is HFOV, and the following conditions are satisfied:

$f$=2.66 mm, Fno=2.4, and HFOV=46.8 degrees.

In the first embodiment of the present wide angle optical lens system, the maximal field of view of the wide angle optical lens system is FOV, and the following condition is satisfied:

FOV=93.6.

In the first embodiment of the present wide angle optical lens system, the focal length of the wide angle optical lens system is f, the focal length of the fifth lens element 150 is f5, and the following condition is satisfied:

$f/f5$=2.92.

In the first embodiment of the present wide angle optical lens system, the radius of curvature of the object-side surface 131 of the third lens element 130 is R5, the radius of curvature of the image-side surface 132 of the third lens element 130 is R6, and the following condition is satisfied:

$(R6+R5)/(R6-R5)$=0.17.

In the first embodiment of the present wide angle optical lens system, half of the maximal field of view of the wide angle optical lens system is HFOV, and the following condition is satisfied:

tan(HFOV)=1.06.

In the first embodiment of the present wide angle optical lens system, the central thickness of the fourth lens element 140 is CT4, the central thickness of the fifth lens element 150 is CT5, and the following condition is satisfied:

$(CT4+CT5)/f$=0.53.

In the first embodiment of the present wide angle optical lens system, the central thickness of the second lens element 120 is CT2, the central thickness of the third lens element 130 is CT3, the distance along an optical axis 190 between the second lens element 120 and the third lens element 130 is T23, the distance from the object-side surface 111 of the first lens element 110 to the image plane 180 along the optical axis 190 is TTL, and the following condition is satisfied:

$(CT2+T23+CT3)/TTL$=0.18.

In the first embodiment of the present wide angle optical lens system, the parallel distance from the point between the position of the maximum effective diameter of the image-side surface 152 of the fifth lens element 150 and the position of the maximum effective diameter of the object-side surface 161 of the sixth lens element 160 to the optical axis 190 is ET56, and the following condition is satisfied:

ET56=0.29.

In the first embodiment of the present wide angle optical lens system, the Abbe number of the fourth lens element 140 is V4, the Abbe number of the sixth lens element 160 is V6, and the following condition is satisfied:

$V6/V4$=0.18.

In the first embodiment of the present wide angle optical lens system, the distance from the aperture stop 100 to the image-side surface 122 of the second lens element 120 along the optical axis 190 is SL2, the distance from the object-side surface 111 of the first lens element 110 to the image-side surface 122 of the second lens element 120 along the optical axis 190 is TL2, and the following condition is satisfied:

$SL2/TL2$=0.43.

In the first embodiment of the present wide angle optical lens system, the distance from the object-side surface 111 of the first lens element 110 to the image plane 180 along the optical axis 190 is TTL, half of the maximum diagonal imaging height of the wide angle optical lens system is ImgH, and the following condition is satisfied:

TTL/ImgH=1.70.

In the first embodiment of the present wide angle optical lens system, the focal length of the wide angle optical lens system is f, the radius of curvature of the image-side surface 152 of the fifth lens element 150 is R10, and the following condition is satisfied:

$R10/f$=−0.21.

In the first embodiment of the present wide angle optical lens system, the central thickness of the fifth lens element 150 is CT5, which has the thickest thickness among the central thicknesses of the first to sixth lens elements 110-160.

In the first embodiment of the present wide angle optical lens system, the distance along the optical axis 190 between the third lens element 130 and the fourth lens element 140 is T34, the distance along the optical axis 190 between the fourth lens element 140 and the fifth lens element 150 is T45, the distance along the optical axis 190 between the fifth lens element 150 and the sixth lens element 160 is T56, and the following condition is satisfied:

T45>T34>T56.

The detailed optical data of the first embodiment is shown in Table 1, and the aspheric surface data is shown in Table 2.

TABLE 1

(Embodiment 1)
f(focal length) = 2.66 mm, Fno = 2.4, HFOV = 46.8 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.3886(ASP) | 0.33 | Plastic | 1.633 | 23.6 | −20 |

TABLE 1-continued (Embodiment 1)
f(focal length) = 2.66 mm, Fno = 2.4, HFOV = 46.8 deg.

| Surface | | Curvature Radius | Thickness | Material | index | Abbe # | Focal length |
|---|---|---|---|---|---|---|---|
| 2 | | 1.1364(ASP) | 0.36 | | | | |
| 3 | Aperture stop | Plane | −0.017 | | | | |
| 4 | Lens 2 | 3.9918(ASP) | 0.54 | Plastic | 1.546 | 55.9 | 2.6092 |
| 5 | | −2.1186(ASP) | 0.03 | | | | |
| 6 | Lens 3 | −3.9766(ASP) | 0.28 | Plastic | 1.633 | 23.6 | −3.5967 |
| 7 | | 5.5536(ASP) | 0.06 | | | | |
| 8 | Lens 4 | 10.3473(ASP) | 0.51 | Plastic | 1.546 | 55.9 | 8.8834 |
| 9 | | −9.0289(ASP) | 0.33 | | | | |
| 10 | Lens 5 | 6.6356(ASP) | 0.89 | Plastic | 1.582 | 30.0 | 0.9113 |
| 11 | | −0.5509(ASP) | 0.03 | | | | |
| 12 | Lens 6 | 3.9418(ASP) | 0.28 | Plastic | 1.633 | 23.6 | −0.8161 |
| 13 | | 0.4466(ASP) | 0.36 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 2

Aspheric Coefficients

| Surface # | 1 | 2 | 4 | 5 | 6 | 7 |
|---|---|---|---|---|---|---|
| K = | −5.1796 | −6.1458 | 14.8238 | 6.2463 | −26.1183 | −39.2385 |
| A4 = | 3.5258E−01 | 7.4661E−01 | −1.2927E−01 | −2.5774E−01 | −4.0588E−01 | −1.5599E−01 |
| A6 = | −7.8536E−02 | −1.3166E−01 | 1.2663E+00 | 4.0858E−01 | 7.0251E−01 | 1.1380E−01 |
| A8 = | 1.6364E−01 | 6.2302E−02 | −1.5872E+01 | −6.3448E−02 | −7.1015E−01 | 1.2799E−02 |
| A10 = | 3.3622E−01 | 4.9780E+00 | 9.4780E+01 | −1.9015E+00 | −6.4602E−02 | −2.5259E−01 |
| A12 = | −8.0917E−01 | −1.0213E+01 | −2.8476E+02 | −1.4209E+00 | −3.0303E+00 | 1.9151E−01 |
| A14 = | 8.5973E−01 | 1.7507E+01 | 3.3063E+02 | 4.6845E+00 | 4.4215E+00 | −1.9729E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −8.9869 | 27.0346 | −67.8031 | −5.4203 | −8.1547 | −4.8705 |
| A4 = | −1.5369E−01 | −2.4925E−01 | −1.1300E−01 | −1.2460E−01 | −2.8780E−01 | −1.5015E−01 |
| A6 = | 9.3789E−02 | 1.3849E−01 | −1.5568E−01 | 3.5384E−02 | 9.2616E−02 | 6.9407E−02 |
| A8 = | −1.3250E−01 | −1.0427E−01 | −2.7038E−02 | −1.5130E−02 | −1.4419E−02 | −1.9856E−02 |
| A10 = | 2.3969E−02 | −6.3402E−03 | −1.8598E−02 | −5.7531E−03 | 1.4225E−02 | 1.8352E−03 |
| A12 = | 1.4040E−01 | 6.2317E−02 | 1.5592E−02 | 4.9195E−04 | −5.9043E−03 | 5.3359E−04 |
| A14 = | −6.7393E−02 | −1.5947E−02 | 8.8775E−03 | 2.8339E−03 | −7.6396E−03 | −2.0743E−04 |
| A16 = | 0 | 0 | −4.5627E−03 | −1.6021E−04 | 5.8718E−03 | 3.0098E−05 |
| A18 = | 0 | 0 | 0 | 0 | −1.1823E−03 | −1.8650E−06 |
| A20 = | 0 | 0 | 0 | 0 | 0 | 0 |

The units of the radius of curvature, the thickness and the focal length in table 1 are expressed in mm, in the tables 1 and 2, the surface numbers 0-16 represent the surfaces sequentially arranged from the object-side to the image-side along the optical axis, and in table 2, k represents the conic coefficient of the equation of the aspheric surface profiles, and $A_4$, $A_6$, $A_8$, $A_{10}$, $A_{12}$, $A_{14}$, $A_{16}$, $A_{18}$, $A_{20}$ . . . : represent the high-order aspheric coefficients arranging from the 4th order to the 20th order. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
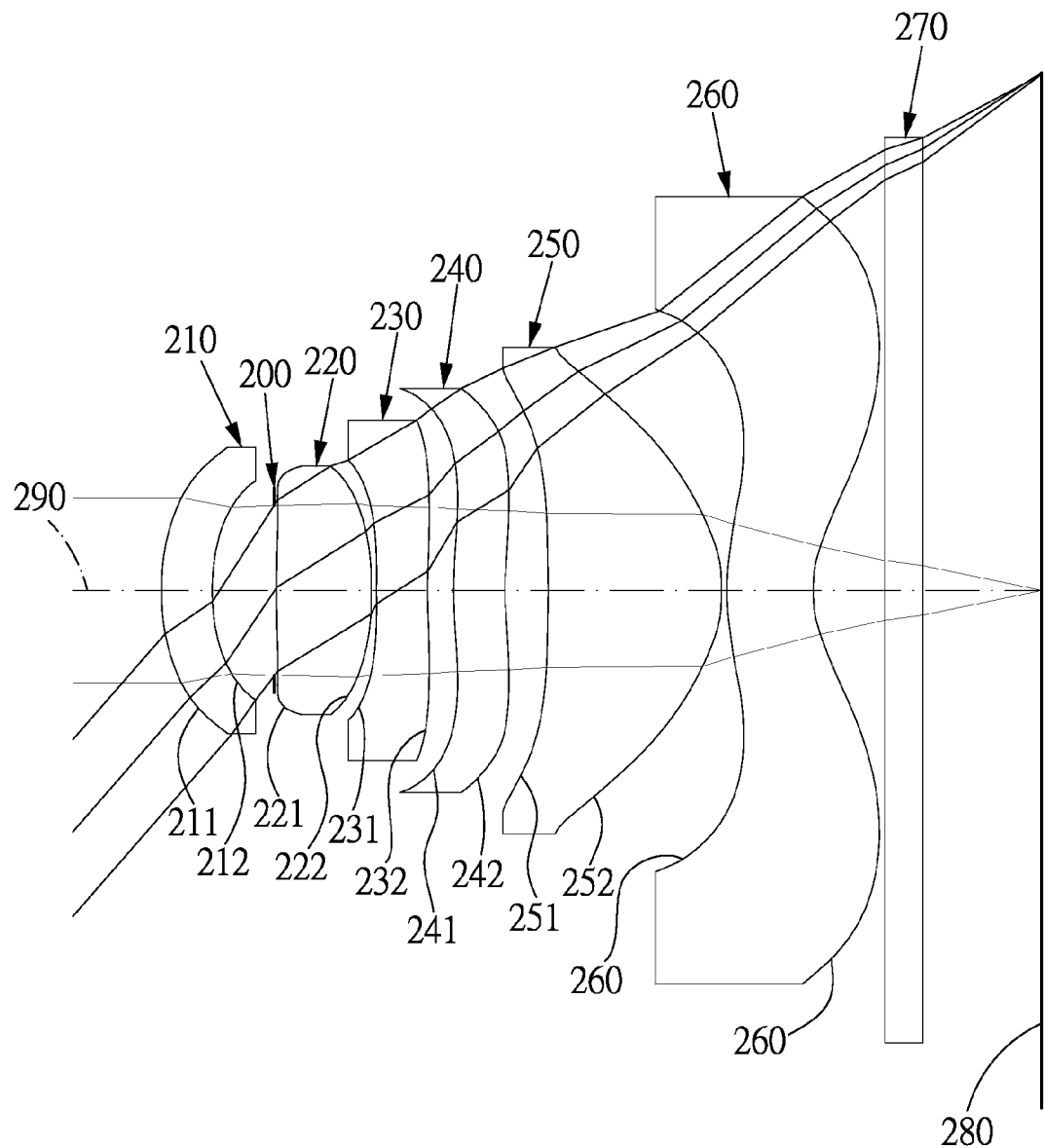
FIG. 2A shows a wide angle optical lens system in accordance with a second embodiment of the present invention.
Figure 2B:
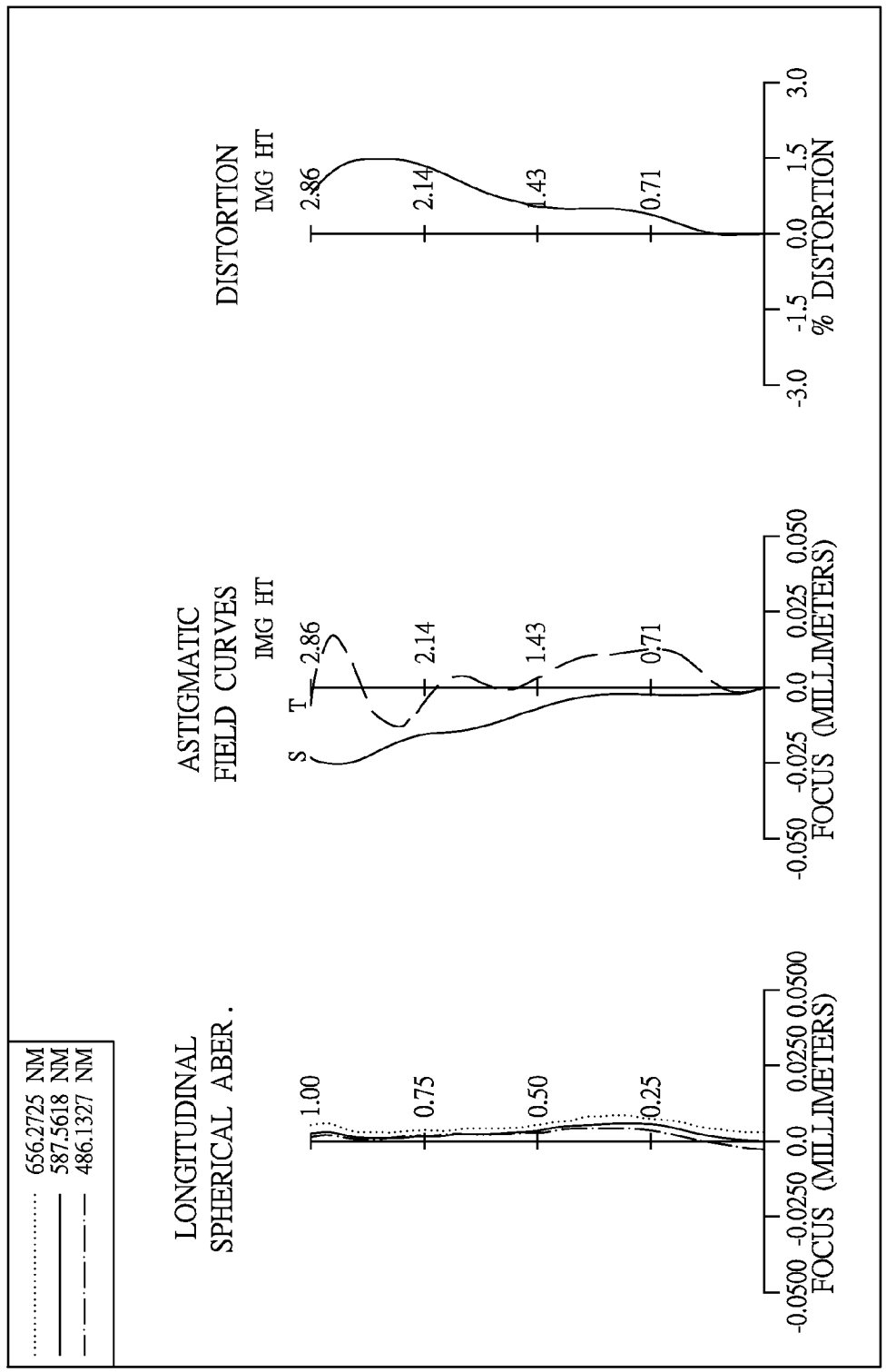
FIG. 2B shows the longitudinal spherical aberration curve, the astigmatic field curve and the distortion curve of the second embodiment of the present invention.

FIG. 2A shows a wide angle optical lens system in accordance with a second embodiment of the present invention, and FIG. 2B shows, in order from left to right, the longitudinal spherical aberration curves, the astigmatic field curves, and the distortion curve of the second embodiment of the present invention. A wide angle optical lens system in accordance with the second embodiment of the present invention comprises an aperture stop 200 and an optical assembly. The optical assembly comprises, in order from an object side to an image side: a first lens element 210, a second lens element 220, a third lens element 230, a fourth lens element 240, a fifth lens element 250, a sixth lens element 260, an IR cut filter 270 and an image plane 280, wherein the wide angle optical lens system has a total of six lens elements with refractive power. The aperture stop 200 is located between an image-side surface 212 of the first lens element 210 and an image-side surface 222 of the second lens element 220.

The first lens element 210 with a negative refractive power has an object-side surface 211 being convex near an optical axis 290 and the image-side surface 212 being concave near the optical axis 290, both the object-side and image-side surfaces 211, 212 are aspheric, and the first lens element 210 is made of plastic material.

The second lens element 220 with a positive refractive power has an object-side surface 221 being convex near the optical axis 290 and the image-side surface 222 being convex near the optical axis 290, both the object-side and image-side surfaces 221, 222 are aspheric, and the second lens element 220 is made of plastic material.

The third lens element 230 with a negative refractive power has an object-side surface 231 being concave near the optical axis 290 and an image-side surface 232 being convex near the optical axis 290, both the object-side and image-side surfaces 231, 232 are aspheric, and the third lens element 230 is made of plastic material.

The fourth lens element 240 with a negative refractive power has an object-side surface 241 being convex near the optical axis 290 and an image-side surface 242 being concave near the optical axis 290, both the object-side and image-side surfaces 241, 242 are aspheric, and the fourth lens element 240 is made of plastic material.

The fifth lens element 250 with a positive refractive power has an object-side surface 251 being concave near the optical axis 290 and an image-side surface 252 being convex near the optical axis 290, both the object-side and image-side surfaces 251, 252 are aspheric, and the fifth lens element 250 is made of plastic material.

The sixth lens element 260 with a negative refractive power has an object-side surface 261 being convex near the optical axis 290 and an image-side surface 262 being concave near the optical axis 290, both the object-side and image-side surfaces 261, 262 are aspheric, the sixth lens element 260 is made of plastic material, and more than one inflection point is formed on the object-side surface 261 and the image-side surface 262 of the sixth lens element 260.

The IR cut filter 270 made of glass is located between the sixth lens element 260 and the image plane 280 and has no influence on the focal length of the wide angle optical lens system.

The detailed optical data of the second embodiment is shown in Table 3 and the aspheric surface data is shown in Table 4 below.

TABLE 3

(Embodiment 2)
f(focal length) = 2.46 mm, Fno = 2.4, HFOV = 49.2 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.3988(ASP) | 0.28 | Plastic | 1.546 | 55.9 | −4.5 |
| 2 | | 1.2361(ASP) | 0.35 | | | | |
| 3 | Aperture stop | Plane | 0.013 | | | | |
| 4 | Lens 2 | 10.3799(ASP) | 0.52 | Plastic | 1.546 | 55.9 | 2.0292 |
| 5 | | −1.9143(ASP) | 0.03 | | | | |
| 6 | Lens 3 | −4.4116(ASP) | 0.28 | Plastic | 1.636 | 23.2 | −4.4921 |
| 7 | | 11.3906(ASP) | 0.14 | | | | |
| 8 | Lens 4 | 3.1259(ASP) | 0.28 | Plastic | 1.546 | 55.9 | 7.9222 |
| 9 | | 2.5187(ASP) | 0.23 | | | | |
| 10 | Lens 5 | −20.6171(ASP) | 0.96 | Plastic | 1.546 | 55.9 | 1.5807 |
| 11 | | −0.7760(ASP) | 0.03 | | | | |
| 12 | Lens 6 | 1.5890(ASP) | 0.47 | Plastic | 1.584 | 30.0 | −1.7981 |
| 13 | | 0.6152(ASP) | 0.40 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 4

Aspheric Coefficients

| Surface # | 1 | 2 | 4 | 5 | 6 | 7 |
|---|---|---|---|---|---|---|
| K = | −5.2265 | −6.7208 | 13.3850 | 5.3475 | −90.0000 | 27.4239 |
| A4 = | 3.8608E−01 | 7.2389E−01 | −9.7878E−02 | −3.0263E−01 | −4.8585E−01 | −1.6204E−01 |
| A6 = | −3.8119E−02 | −9.4475E−02 | 1.2449E+00 | 4.9794E−01 | 6.0193E−01 | 9.1200E−02 |
| A8 = | 1.8259E−01 | 1.9970E−01 | −1.5647E+01 | −4.0684E−01 | −6.3914E−01 | 1.7902E−02 |
| A10 = | 3.4120E−01 | 4.8277E+00 | 9.3446E+01 | −1.5020E+00 | −2.5138E−01 | −2.3066E−01 |
| A12 = | −7.4291E−01 | −9.5990E+00 | −2.8461E+02 | −1.4448E+00 | −3.0069E+00 | 2.0080E−01 |
| A14 = | 1.0713E+00 | 1.5922E+01 | 3.3544E+02 | 4.5454E+00 | 4.4056E+00 | −5.4190E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −90.0000 | −55.2203 | −90.0000 | −2.9251 | −7.5799 | −3.5480 |
| A4 = | −1.8397E−01 | −2.0582E−01 | −9.8182E−02 | −1.5577E−01 | −1.8230E−01 | −1.6001E−01 |
| A6 = | 8.5708E−02 | 8.9987E−02 | −5.7101E−03 | 4.0900E−02 | 4.9199E−02 | 7.3426E−02 |
| A8 = | −1.4756E−01 | −1.1683E−01 | −1.6041E−02 | −9.5219E−03 | −2.6456E−02 | −2.0903E−02 |
| A10 = | 4.6081E−03 | −1.1111E−02 | −1.3116E−02 | −4.3957E−03 | 2.3770E−02 | 2.0102E−03 |
| A12 = | 1.1998E−01 | 5.6215E−02 | 1.6645E−02 | 6.9066E−04 | −3.7150E−03 | 5.3933E−04 |
| A14 = | −7.9514E−02 | −2.5049E−02 | 8.6736E−03 | 2.7904E−03 | −9.0808E−03 | −2.0960E−04 |
| A16 = | 0 | 0 | −4.9441E−03 | −2.2913E−04 | 5.1191E−03 | 2.8652E−05 |
| A18 = | 0 | 0 | 0 | 0 | −8.3646E−04 | −1.5340E−06 |
| A20 = | 0 | 0 | 0 | 0 | 0 | 0 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| Embodiment 2 | | | |
|---|---|---|---|
| Fno | 2.4 | ET56 | 0.59 |
| FOV | 98.3 | V6/V4 | 0.48 |
| f/f5 | 1.70 | SL2/TL2 | 0.46 |
| (R6 + R5)/(R6 − R5) | 0.44 | TTL/ImgH | 1.70 |
| tan(HFOV) | 1.16 | R10/f | −0.31 |
| (CT4 + CT5)/f | 0.50 | CT5 has the thickest thickness | Yes |
| (CT2 + T23 + CT3)/TTL | 0.17 | T45 > T34 > T56 | Yes |

Figure 3A:
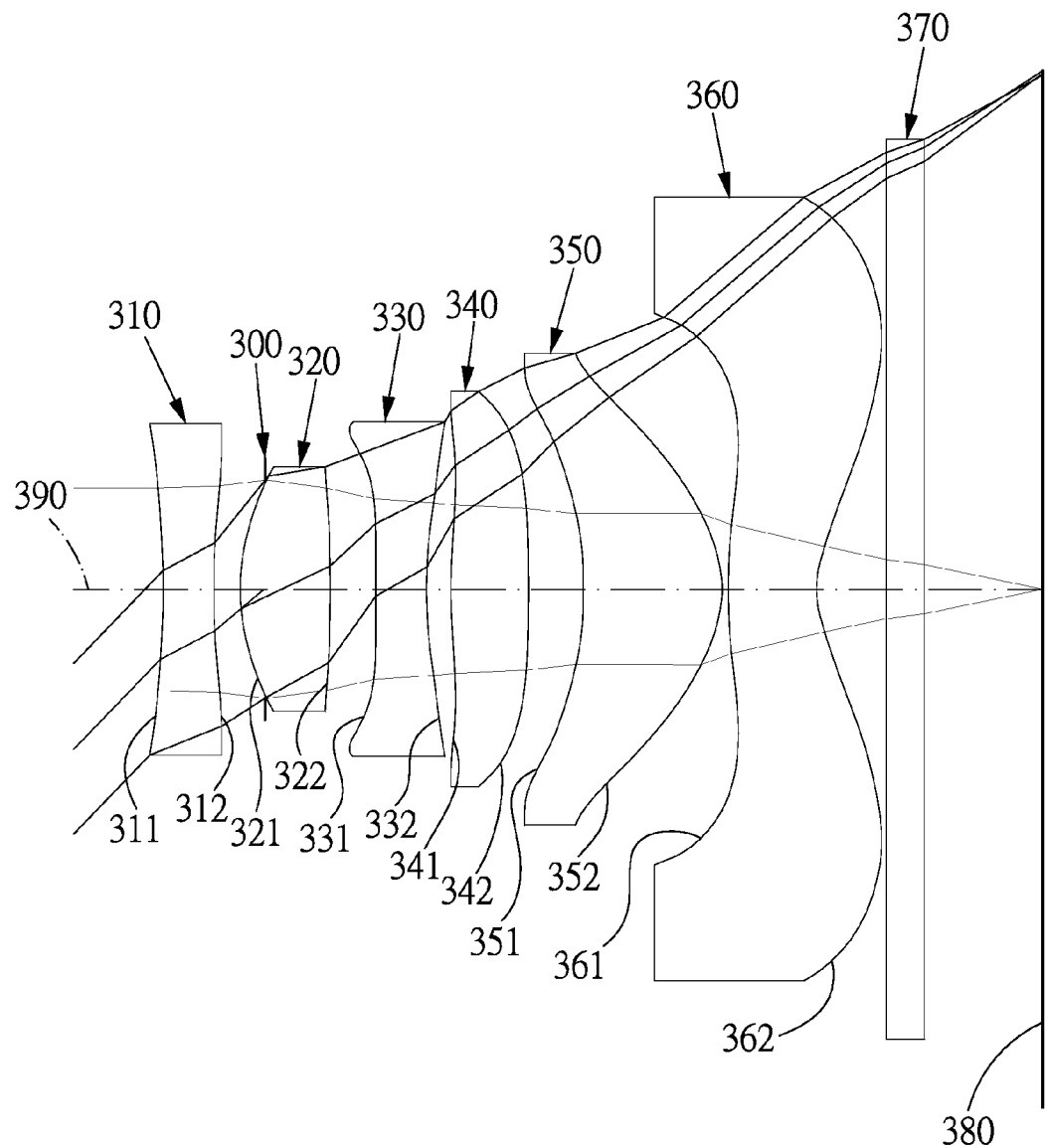
FIG. 3A shows a wide angle optical lens system in accordance with a third embodiment of the present invention.
Figure 3B:
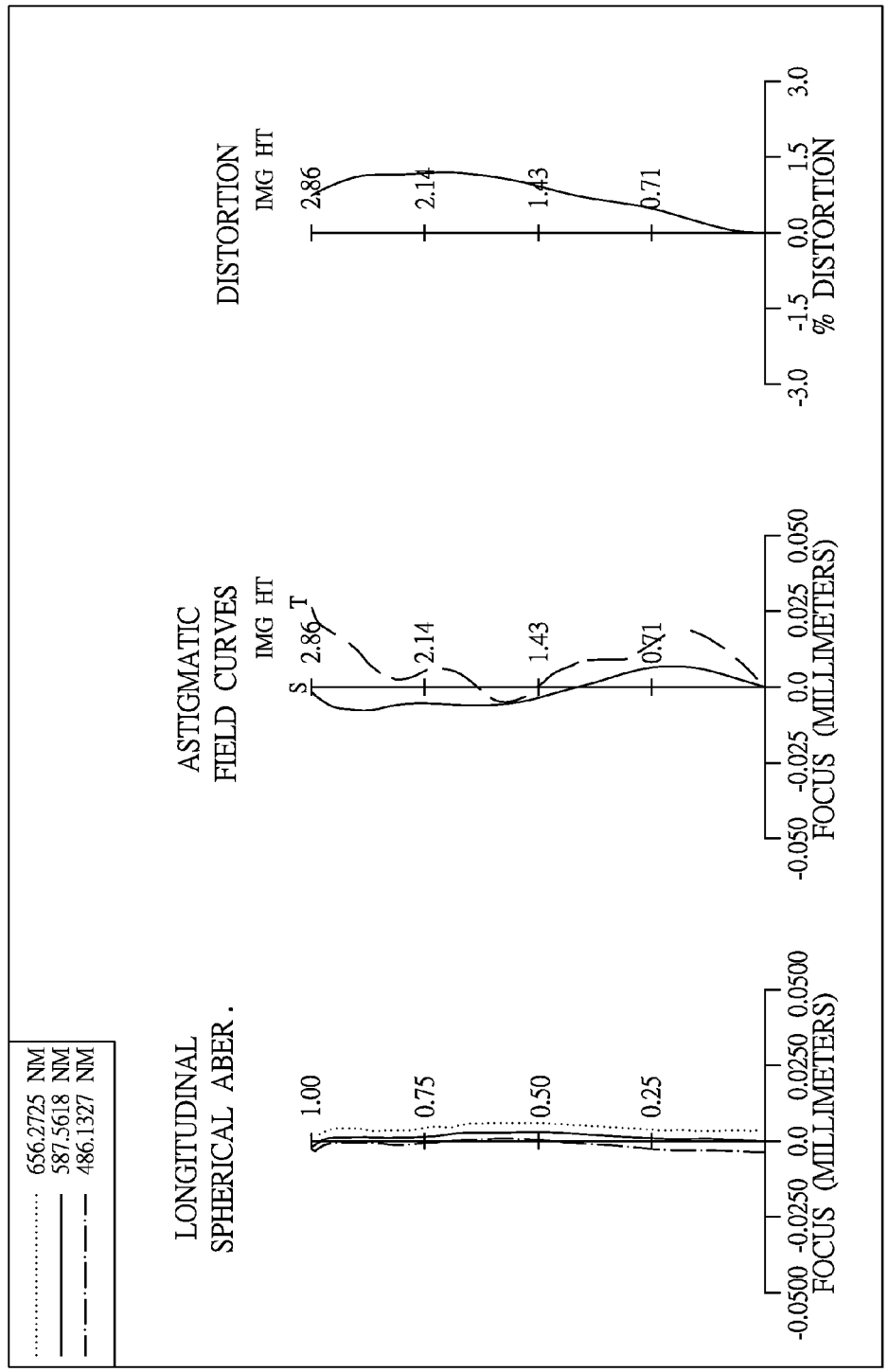
FIG. 3B shows the longitudinal spherical aberration curve, the astigmatic field curve and the distortion curve of the third embodiment of the present invention.

FIG. 3A shows a wide angle optical lens system in accordance with a third embodiment of the present invention, and FIG. 3B shows, in order from left to right, the longitudinal spherical aberration curves, the astigmatic field curves, and the distortion curve of the third embodiment of the present invention. A wide angle optical lens system in accordance with the third embodiment of the present invention comprises an aperture stop 300 and an optical assembly. The optical assembly comprises, in order from an object side to an image side: a first lens element 310, a second lens element 320, a third lens element 330, a fourth lens element 340, a fifth lens element 350, a sixth lens element 360, an IR cut filter 370 and an image plane 380, wherein the wide angle optical lens system has a total of six lens elements with refractive power. The aperture stop 300 is located between an image-side surface 312 of the first lens element 310 and an image-side surface 322 of the second lens element 320.

The first lens element 310 with a negative refractive power has an object-side surface 311 being concave near an optical axis 390 and the image-side surface 312 being convex near the optical axis 390, both the object-side and image-side surfaces 311, 312 are aspheric, and the first lens element 310 is made of plastic material.

The second lens element 320 with a positive refractive power has an object-side surface 321 being convex near the optical axis 390 and the image-side surface 322 being convex near the optical axis 390, both the object-side and image-side surfaces 321, 322 are aspheric, and the second lens element 320 is made of plastic material.

The third lens element 330 with a negative refractive power has an object-side surface 331 being convex near the optical axis 390 and an image-side surface 332 being concave near the optical axis 390, both the object-side and image-side surfaces 331, 332 are aspheric, and the third lens element 330 is made of plastic material.

The fourth lens element 340 with a positive refractive power has an object-side surface 341 being convex near the optical axis 390 and an image-side surface 342 being convex near the optical axis 390, both the object-side and image-side surfaces 341, 342 are aspheric, and the fourth lens element 340 is made of plastic material.

The fifth lens element 350 with a positive refractive power has an object-side surface 351 being concave near the optical axis 390 and an image-side surface 352 being convex near the optical axis 390, both the object-side and image-side surfaces 351, 252 are aspheric, and the fifth lens element 350 is made of plastic material.

The sixth lens element 360 with a negative refractive power has an object-side surface 361 being convex near the optical axis 390 and an image-side surface 362 being concave near the optical axis 390, both the object-side and image-side surfaces 361, 362 are aspheric, the sixth lens element 360 is made of plastic material, and more than one inflection point is formed on the object-side surface 361 and the image-side surface 362 of the sixth lens element 360.

The IR cut filter 370 made of glass is located between the sixth lens element 360 and the image plane 380 and has no influence on the focal length of the wide angle optical lens system.

The detailed optical data of the third embodiment is shown in Table 5 and the aspheric surface data is shown in Table 6 below.

TABLE 5

(Embodiment 3)
f(focal length) = 2.74 mm, Fno = 2.4, HFOV = 46.2 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | −7.7204(ASP) | 0.28 | Plastic | 1.607 | 26.6 | −49.9997 |
| 2 | | 3.6688(ASP) | 0.29 | | | | |
| 3 | Aperture stop | Plane | −0.136 | | | | |
| 4 | Lens 2 | 1.2991(ASP) | 0.49 | Plastic | 1.546 | 55.9 | 2.9948 |
| 5 | | −6.8936(ASP) | 0.25 | | | | |
| 6 | Lens 3 | 10.8587(ASP) | 0.28 | Plastic | 1.633 | 23.6 | −4.9607 |
| 7 | | 2.2350(ASP) | 0.14 | | | | |
| 8 | Lens 4 | 4.8292(ASP) | 0.42 | Plastic | 1.546 | 55.9 | −28.2928 |
| 9 | | −41.5649(ASP) | 0.31 | | | | |
| 10 | Lens 5 | −2.2794(ASP) | 0.76 | Plastic | 1.582 | 30.0 | 1.4469 |
| 11 | | −0.7021(ASP) | 0.03 | | | | |
| 12 | Lens 6 | 2.3279(ASP) | 0.50 | Plastic | 1.607 | 26.6 | −2.0229 |
| 13 | | 0.6693(ASP) | 0.38 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 6

Aspheric Coefficients

| Surface # | 1 | 2 | 4 | 5 | 6 | 7 |
|---|---|---|---|---|---|---|
| K = | −4.7294 | −61.8628 | 0.3527 | 20.3170 | −83.1597 | −15.2712 |
| A4 = | −4.4564E−02 | −3.4192E−02 | −1.3658E−01 | −1.0886E−02 | −3.1244E−01 | −1.1179E−01 |
| A6 = | 4.2786E−02 | −4.4644E−03 | 1.3271E−01 | −1.8351E−02 | 7.2421E−02 | 8.6561E−02 |
| A8 = | −6.3096E−02 | 2.2714E−02 | 5.1356E−02 | 2.7695E−01 | −3.5775E−01 | 1.7177E−02 |
| A10 = | 6.2735E−02 | 1.5308E−01 | −7.7899E−02 | −4.5848E−01 | 7.2849E−01 | −1.6646E−01 |
| A12 = | −3.5947E−02 | −3.5369E−01 | −8.9724E−01 | −3.6786E−01 | −1.6114E+00 | 2.5259E−01 |
| A14 = | 1.2345E−02 | 2.9132E−01 | 1.9356E+00 | 1.8973E+00 | 1.5335E+00 | −1.0265E−01 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −45.9534 | −90.0000 | 1.5862 | −2.5871 | −39.0454 | −4.8552 |
| A4 = | −1.3564E−01 | −1.6626E−01 | −3.6092E−02 | −1.3472E−01 | −5.0899E−02 | −9.6515E−02 |
| A6 = | 8.8499E−02 | 4.8138E−02 | 4.5778E−02 | 3.6703E−02 | −2.0410E−02 | 3.8601E−02 |
| A8 = | −3.3188E−02 | −5.9676E−02 | −1.2659E−02 | 2.0774E−02 | −1.7572E−02 | −1.1225E−02 |
| A10 = | 1.9731E−02 | −3.3770E−03 | −1.3221E−02 | −2.8027E−03 | 3.2104E−02 | 7.8351E−04 |
| A12 = | −5.1553E−02 | 3.1440E−02 | 1.5642E−02 | 1.7397E−03 | −1.0334E−02 | 4.7383E−04 |
| A14 = | 3.7248E−02 | −1.8417E−02 | 1.0669E−02 | 1.8825E−03 | −8.6915E−03 | −1.5828E−04 |
| A16 = | 0 | 0 | −6.0938E−03 | −1.7869E−04 | 6.5083E−03 | 2.0810E−05 |
| A18 = | 0 | 0 | 0 | 0 | −1.2476E−03 | −1.1313E−06 |
| A20 = | 0 | 0 | 0 | 0 | 0 | 0 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| Embodiment 3 | | | |
|---|---|---|---|
| Fno | 2.4 | ET56 | 0.49 |
| FOV | 92.4 | V6/V4 | 0.54 |
| f/f5 | 1.73 | SL2/TL2 | 0.39 |
| (R6 + R5)/(R6 − R5) | −1.52 | TTL/ImgH | 1.70 |
| tan(HFOV) | 1.04 | R10/f | −0.26 |
| (CT4 + CT5)/f | 0.43 | CT5 has the thickest thickness | Yes |
| (CT2 + T23 + CT3)/TTL | 0.21 | T45 > T34 > T56 | Yes |

Figure 4A:
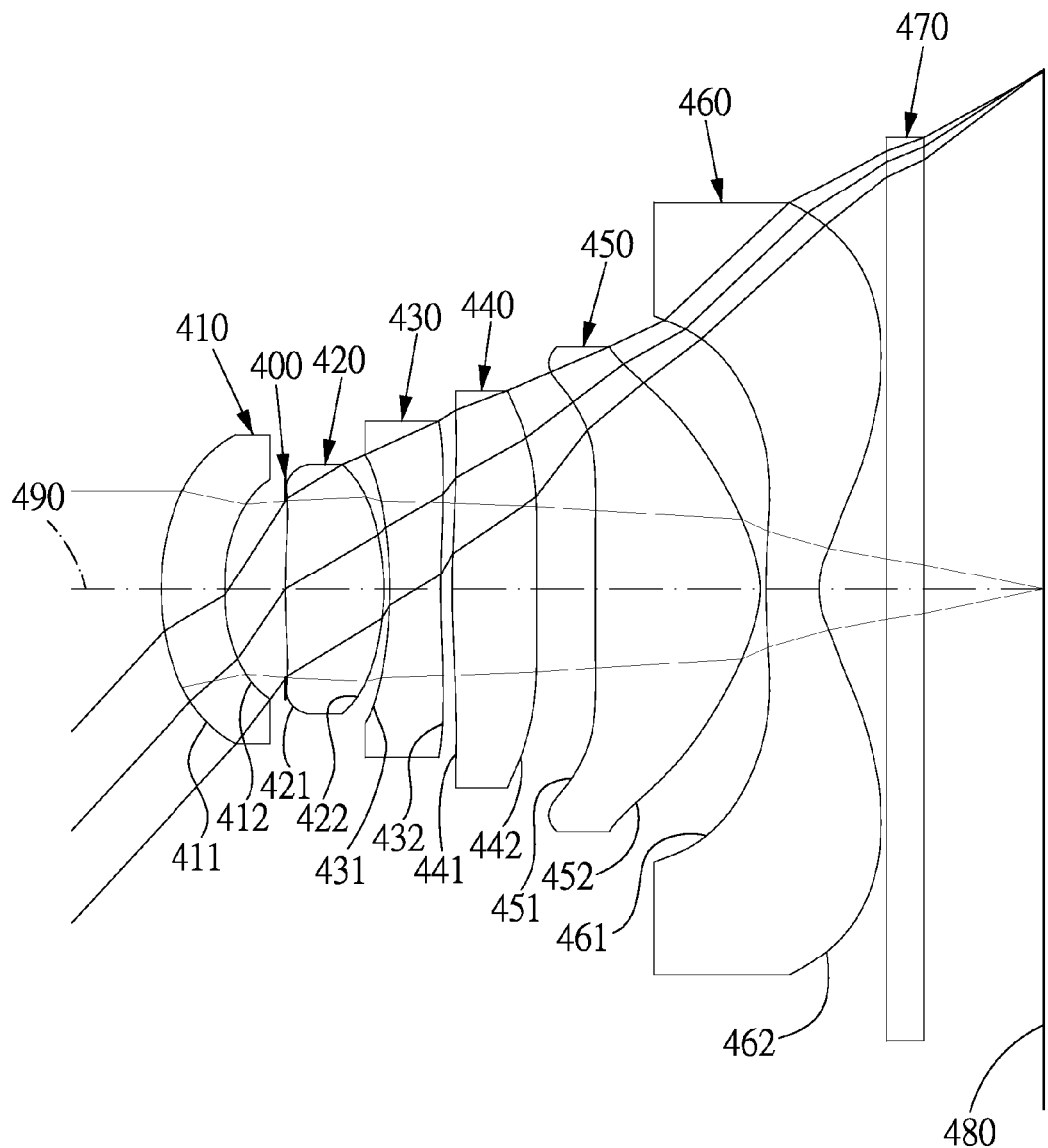
FIG. 4A shows a wide angle optical lens system in accordance with a fourth embodiment of the present invention.
Figure 4B:
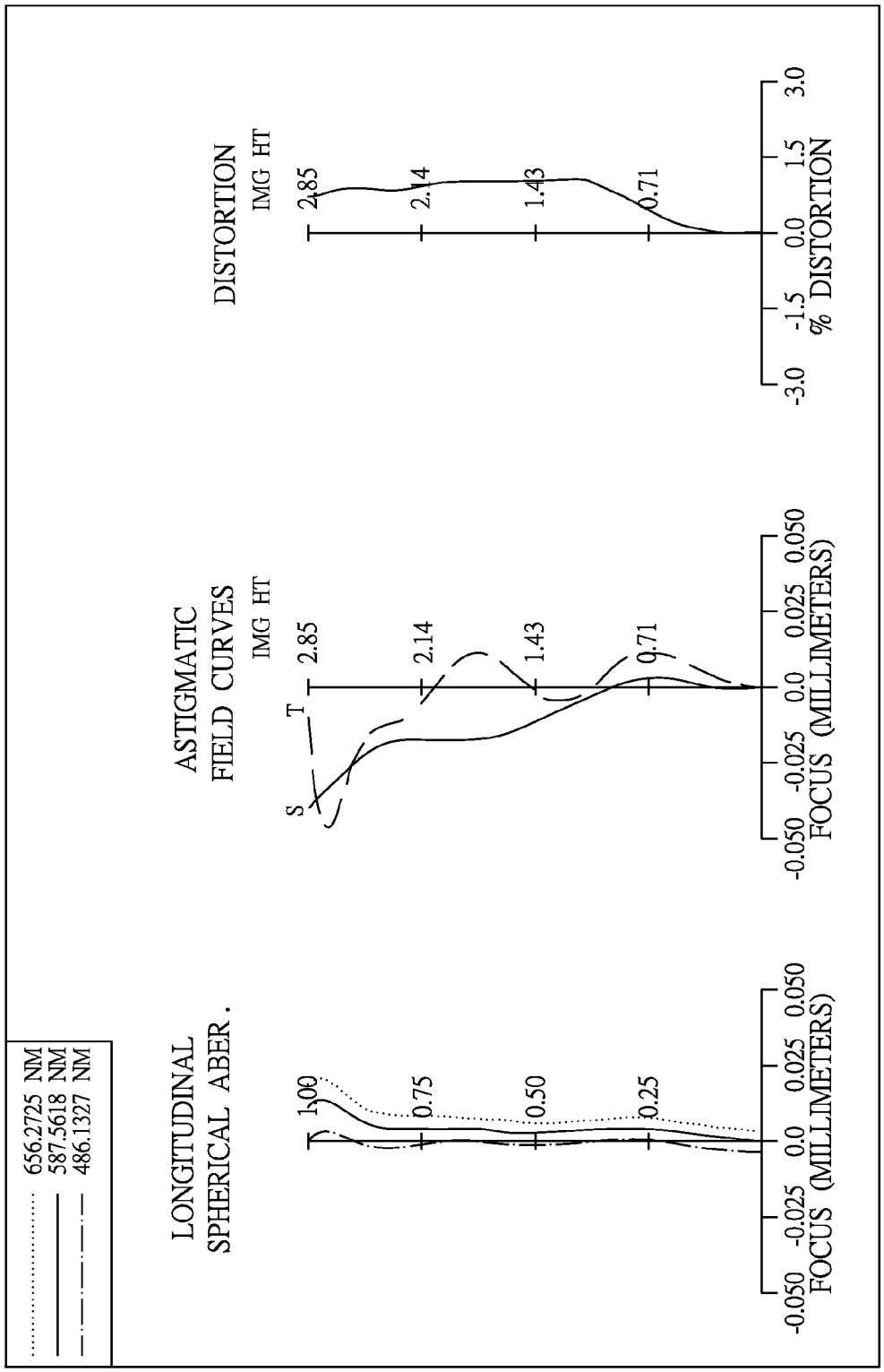
FIG. 4B shows the longitudinal spherical aberration curve, the astigmatic field curve and the distortion curve of the fourth embodiment of the present invention.

FIG. 4A shows a wide angle optical lens system in accordance with a fourth embodiment of the present invention, and FIG. 4B shows, in order from left to right, the longitudinal spherical aberration curves, the astigmatic field curves, and the distortion curve of the fourth embodiment of the present invention. A wide angle optical lens system in accordance with the fourth embodiment of the present invention comprises an aperture stop 400 and an optical assembly. The optical assembly comprises, in order from an object side to an image side: a first lens element 410, a second lens element 420, a third lens element 430, a fourth lens element 440, a fifth lens element 450, a sixth lens element 460, an IR cut filter 470 and an image plane 480, wherein the wide angle optical lens system has a total of six lens elements with refractive power. The aperture stop 400 is located between an image-side surface 412 of the first lens element 410 and an image-side surface 422 of the second lens element 420.

The first lens element 410 with a negative refractive power has an object-side surface 411 being convex near an optical axis 490 and the image-side surface 412 being concave near the optical axis 490, both the object-side and image-side surfaces 411, 412 are aspheric, and the first lens element 410 is made of plastic material.

The second lens element 420 with a positive refractive power has an object-side surface 421 being convex near the optical axis 490 and the image-side surface 422 being convex near the optical axis 490, both the object-side and image-side surfaces 421, 422 are aspheric, and the second lens element 420 is made of plastic material.

The third lens element 430 with a negative refractive power has an object-side surface 431 being concave near the optical axis 490 and an image-side surface 432 being convex near the optical axis 490, both the object-side and image-side surfaces 431, 432 are aspheric, and the third lens element 430 is made of plastic material.

The fourth lens element 440 with a positive refractive power has an object-side surface 441 being convex near the optical axis 490 and an image-side surface 442 being concave near the optical axis 490, both the object-side and image-side surfaces 441, 442 are aspheric, and the fourth lens element 440 is made of plastic material.

The fifth lens element 450 with a positive refractive power has an object-side surface 451 being convex near the optical axis 490 and an image-side surface 452 being convex near the optical axis 490, both the object-side and image-side surfaces 451, 452 are aspheric, and the fifth lens element 450 is made of plastic material.

The sixth lens element 460 with a negative refractive power has an object-side surface 461 being convex near the optical axis 490 and an image-side surface 462 being concave near the optical axis 490, both the object-side and image-side surfaces 461, 462 are aspheric, the sixth lens element 460 is made of plastic material, and more than one inflection point is formed on the object-side surface 461 and the image-side surface 462 of the sixth lens element 460.

The IR cut filter 470 made of glass is located between the sixth lens element 460 and the image plane 480 and has no influence on the focal length of the wide angle optical lens system.

The detailed optical data of the fourth embodiment is shown in Table 7 and the aspheric surface data is shown in Table 8 below.

TABLE 7

(Embodiment 4)
f(focal length) = 2.63 mm, Fno = 2.4, HFOV = 47.4 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.4595(ASP) | 0.35 | Plastic | 1.633 | 23.6 | −20 |
| 2 | | 1.1856(ASP) | 0.34 | | | | |
| 3 | Aperture stop | Plane | −0.003 | | | | |
| 4 | Lens 2 | 5.8922(ASP) | 0.54 | Plastic | 1.546 | 55.9 | 2.5628 |
| 5 | | −1.7832(ASP) | 0.03 | | | | |
| 6 | Lens 3 | −3.6909(ASP) | 0.28 | Plastic | 1.633 | 23.6 | −3.6511 |
| 7 | | 6.4739(ASP) | 0.06 | | | | |
| 8 | Lens 4 | 4.8141(ASP) | 0.47 | Plastic | 1.542 | 55.8 | 12.8671 |
| 9 | | 14.8740(ASP) | 0.32 | | | | |
| 10 | Lens 5 | 7.4917(ASP) | 0.91 | Plastic | 1.574 | 31.0 | 0.921 |
| 11 | | −0.5464(ASP) | 0.03 | | | | |
| 12 | Lens 6 | 3.2078(ASP) | 0.30 | Plastic | 1.633 | 23.6 | −0.8495 |
| 13 | | 0.4464(ASP) | 0.37 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 8

Aspheric Coefficients

| Surface # | 1 | 2 | 4 | 5 | 6 | 7 |
|---|---|---|---|---|---|---|
| K = | −6.0764 | −6.6546 | −86.5807 | 4.2879 | −34.6946 | 38.9612 |
| A4 = | 3.5744E−01 | 7.3933E−01 | −7.8801E−02 | −2.7761E−01 | −4.0445E−01 | −1.6897E−01 |
| A6 = | −1.1266E−01 | −7.4552E−02 | 1.2035E+00 | 4.7802E−01 | 7.1353E−01 | 9.5861E−02 |
| A8 = | 1.6766E−01 | −2.3547E−01 | −1.5854E+01 | −8.4034E−02 | −6.2599E−01 | 1.9743E−02 |
| A10 = | 3.7950E−01 | 5.5937E+00 | 9.3824E+01 | −1.5609E+00 | 6.4334E+00 | −2.3920E−01 |
| A12 = | −8.7086E−01 | −9.1181E+00 | −2.8080E+02 | −1.5459E+00 | −2.6850E+00 | 1.9919E−01 |
| A14 = | 8.3073E−01 | 1.5747E+01 | 3.2387E+02 | 4.1616E+00 | 3.8359E+00 | −5.2161E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −77.5818 | −90.0000 | −36.5794 | −4.9856 | −3.6744 | −4.6702 |
| A4 = | −9.4816E−02 | −2.5084E−01 | −1.0726E−01 | −1.3910E−01 | −2.9715E−01 | −1.5199E−01 |
| A6 = | 1.1722E−01 | 1.6308E−01 | −2.9169E−02 | 4.4775E−02 | 8.0743E−02 | 6.8214E−02 |
| A8 = | −1.3423E−01 | −1.0791E−01 | −2.6562E−02 | −1.9777E−02 | −3.4654E−03 | −1.8275E−02 |
| A10 = | 1.4564E−02 | −8.0006E−03 | −1.8312E−02 | −6.8212E−03 | 1.3985E−02 | 1.5679E−03 |
| A12 = | 1.3142E−01 | 6.2699E−02 | 1.5557E−02 | 1.0879E−03 | −7.5290E−03 | 4.6332E−04 |
| A14 = | −7.5913E−02 | −1.9184E−02 | 1.0153E−02 | 3.3598E−03 | −7.6874E−03 | −1.9508E−04 |
| A16 = | 0 | 0 | −2.5964E−03 | 3.9072E−05 | 6.0600E−03 | 3.2888E−05 |
| A18 = | 0 | 0 | 0 | 0 | −1.2287E−03 | −2.3586E−06 |
| A20 = | 0 | 0 | 0 | 0 | 0 | 0 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| Embodiment 4 | | | |
|---|---|---|---|
| Fno | 2.4 | ET56 | 0.31 |
| FOV | 94.8 | V6/V4 | 0.42 |
| f/f5 | 2.86 | SL2/TL2 | 0.44 |
| (R6 + R5)/(R6 − R5) | 0.27 | TTL/ImgH | 1.70 |

-continued

| Embodiment 4 | | | |
|---|---|---|---|
| tan(HFOV) | 1.09 | R10/f | −0.21 |
| (CT4 + CT5)/f | 0.52 | CT5 has the thickest thickness | Yes |
| (CT2 + T23 + CT3)/TTL | 0.18 | T45 > T34 > T56 | Yes |

Figure 5A:
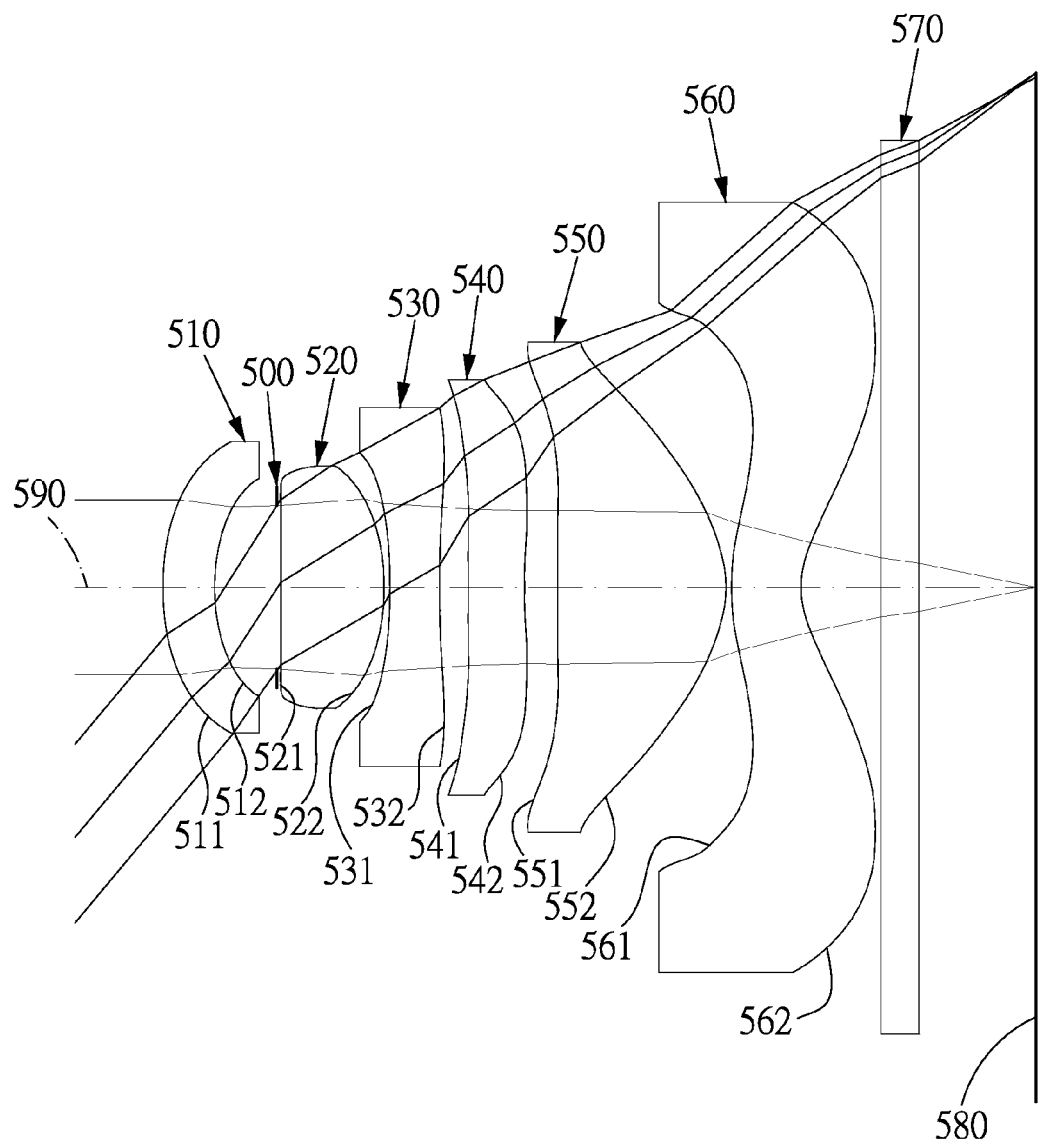
FIG. 5A shows a wide angle optical lens system in accordance with a fifth embodiment of the present invention.
Figure 5B:
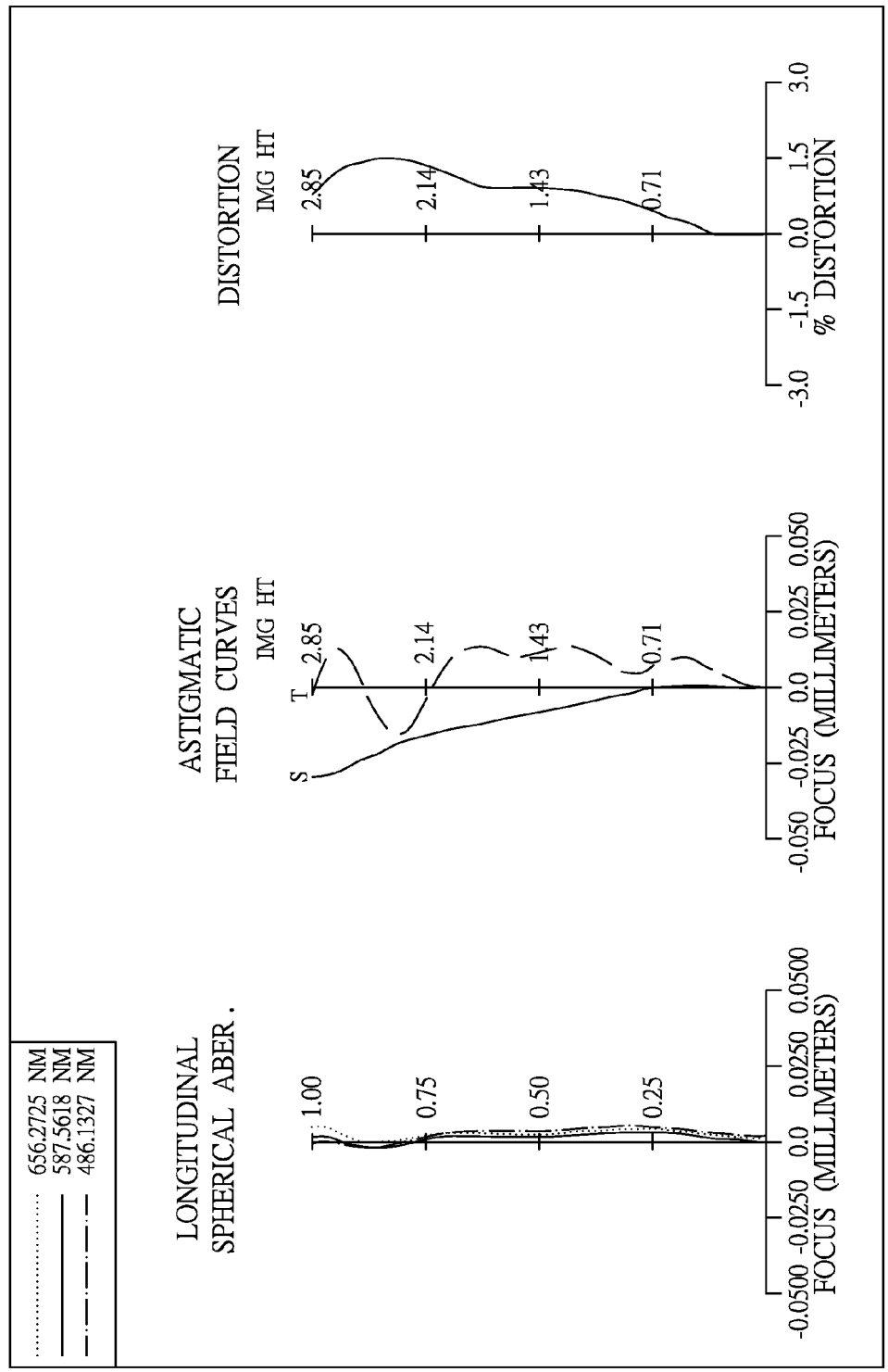
FIG. 5B shows the longitudinal spherical aberration curve, the astigmatic field curve and the distortion curve of the fifth embodiment of the present invention.

FIG. 5A shows a wide angle optical lens system in accordance with a fifth embodiment of the present invention, and FIG. 5B shows, in order from left to right, the longitudinal spherical aberration curves, the astigmatic field curves, and the distortion curve of the fifth embodiment of the present invention. A wide angle optical lens system in accordance with the fifth embodiment of the present invention comprises an aperture stop 500 and an optical assembly. The optical assembly comprises, in order from an object side to an image side: a first lens element 510, a second lens element 520, a third lens element 530, a fourth lens element 540, a fifth lens element 550, a sixth lens element 560, an IR cut filter 570 and an image plane 580, wherein the wide angle optical lens system has a total of six lens elements with refractive power. The aperture stop 500 is located between an image-side surface 512 of the first lens element 510 and an image-side surface 522 of the second lens element 520.

The first lens element 510 with a negative refractive power has an object-side surface 511 being convex near an optical axis 590 and the image-side surface 512 being concave near the optical axis 590, both the object-side and image-side surfaces 511, 512 are aspheric, and the first lens element 510 is made of plastic material.

The second lens element 520 with a positive refractive power has an object-side surface 521 being convex near the optical axis 590 and the image-side surface 522 being convex near the optical axis 590, both the object-side and image-side surfaces 521, 522 are aspheric, and the second lens element 520 is made of plastic material.

The third lens element 530 with a negative refractive power has an object-side surface 531 being concave near the optical axis 590 and an image-side surface 532 being concave near the optical axis 590, both the object-side and image-side surfaces 531, 532 are aspheric, and the third lens element 530 is made of plastic material.

The fourth lens element 540 with a negative refractive power has an object-side surface 541 being convex near the optical axis 590 and an image-side surface 542 being concave near the optical axis 590, both the object-side and image-side surfaces 541, 542 are aspheric, and the fourth lens element 540 is made of plastic material.

The fifth lens element 550 with a positive refractive power has an object-side surface 551 being convex near the optical axis 590 and an image-side surface 552 being convex near the optical axis 590, both the object-side and image-side surfaces 551, 552 are aspheric, and the fifth lens element 550 is made of plastic material.

The sixth lens element 560 with a negative refractive power has an object-side surface 561 being convex near the optical axis 590 and an image-side surface 562 being concave near the optical axis 590, both the object-side and image-side surfaces 561, 562 are aspheric, the sixth lens element 560 is made of plastic material, and more than one inflection point is formed on the object-side surface 561 and the image-side surface 562 of the sixth lens element 560.

The IR cut filter 570 made of glass is located between the sixth lens element 560 and the image plane 580 and has no influence on the focal length of the wide angle optical lens system.

The detailed optical data of the fifth embodiment is shown in Table 9 and the aspheric surface data is shown in Table 10 below.

TABLE 9

(Embodiment 5)
f(focal length) = 2.39 mm, Fno = 2.4, HFOV = 50.1 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.5397(ASP) | 0.29 | Plastic | 1.607 | 26.6 | −20 |
| 2 | | 1.2707(ASP) | 0.35 | | | | |
| 3 | Aperture stop | Plane | 0.019 | | | | |
| 4 | Lens 2 | 15.4974(ASP) | 0.57 | Plastic | 1.546 | 55.9 | 2.1528 |
| 5 | | −1.2600(ASP) | 0.03 | | | | |
| 6 | Lens 3 | −3.5360(ASP) | 0.28 | Plastic | 1.607 | 26.6 | −3.5785 |
| 7 | | 5.8861(ASP) | 0.15 | | | | |
| 8 | Lens 4 | 12.8935(ASP) | 0.31 | Plastic | 1.546 | 55.9 | −11.2831 |
| 9 | | 4.1426(ASP) | 0.19 | | | | |
| 10 | Lens 5 | 186.7555(ASP) | 0.93 | Plastic | 1.546 | 55.9 | 1.3592 |
| 11 | | −0.7464(ASP) | 0.03 | | | | |
| 12 | Lens 6 | 1.2483(ASP) | 0.39 | Plastic | 1.607 | 26.6 | −1.879 |
| 13 | | 0.5268(ASP) | 0.44 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 10

Aspheric Coefficients

| Surface # | 1 | 2 | 4 | 5 | 6 | 7 |
|---|---|---|---|---|---|---|
| K = | −0.9186 | −7.4057 | −90.0000 | 1.6825 | −44.5852 | 3.4153 |
| A4 = | 1.9595E−01 | 7.5867E−01 | −1.1296E−01 | 2.5031E−02 | −2.7508E−01 | −1.2605E−01 |
| A6 = | 8.5488E−02 | −1.7251E−01 | 1.1513E+00 | −5.4030E−02 | 2.5760E−01 | 9.9607E−02 |
| A8 = | 1.3091E−01 | 8.6706E−02 | −1.7948E+01 | −2.6050E−01 | −8.3293E−01 | −7.6634E−04 |
| A10 = | 1.4612E−01 | 7.0859E+00 | 1.2135E+02 | −4.4503E−01 | 6.7913E−01 | −2.1159E−01 |
| A12 = | −4.2091E−01 | −1.7024E+01 | −4.0899E+02 | 1.2876E+00 | −1.0491E+00 | 2.2652E−01 |
| A14 = | 7.6678E−01 | 2.6272E+01 | 5.2433E+02 | −1.2373E+00 | 9.2321E−01 | −7.9373E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

TABLE 10-continued

Aspheric Coefficients

| Surface # | 8 | 9 | 10 | 11 | 12 | 13 |
|---|---|---|---|---|---|---|
| K = | −90.0000 | −82.6080 | 90.0000 | −2.9832 | −8.9200 | −3.4533 |
| A4 = | −1.7568E−01 | −1.6019E−01 | −4.1813E−02 | −1.1510E−01 | −1.2052E−01 | −1.3862E−01 |
| A6 = | 1.0144E−01 | 3.4809E−02 | −1.7900E−02 | 3.5154E−02 | 1.4299E−02 | 5.6032E−02 |
| A8 = | −2.6578E−02 | −5.6277E−02 | −5.4871E−03 | −4.4554E−03 | −3.6332E−02 | −1.7101E−02 |
| A10 = | 3.6736E−02 | −1.2655E−02 | −1.9431E−02 | −4.1992E−03 | 3.4737E−02 | 2.3976E−03 |
| A12 = | −4.3168E−02 | 3.1039E−02 | 1.0299E−02 | 2.1210E−03 | −4.6473E−03 | 3.5788E−04 |
| A14 = | 1.2457E−02 | −7.2202E−03 | 1.0410E−02 | 2.0753E−03 | −9.3764E−03 | −2.3286E−04 |
| A16 = | 0 | 0 | −4.5361E−03 | −5.2421E−04 | 5.0223E−03 | 4.0245E−05 |
| A18 = | 0 | 0 | 0 | 0 | −8.1787E−04 | −2.5332E−06 |
| A20 = | 0 | 0 | 0 | 0 | 0 | 0 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

Embodiment 5

| Fno | 2.4 | ET56 | 0.50 |
|---|---|---|---|
| FOV | 100.2 | V6/V4 | 0.48 |
| f/f5 | 1.76 | SL2/TL2 | 0.48 |
| (R6 + R5)/(R6 − R5) | 0.25 | TTL/ImgH | 1.70 |
| tan(HFOV) | 1.20 | R10/f | −0.31 |
| (CT4 + CT5)/f | 0.52 | CT5 has the thickest thickness | Yes |
| (CT2 + T23 + CT3)/TTL | 0.18 | T45 > T34 > T56 | Yes |

Figure 6A:
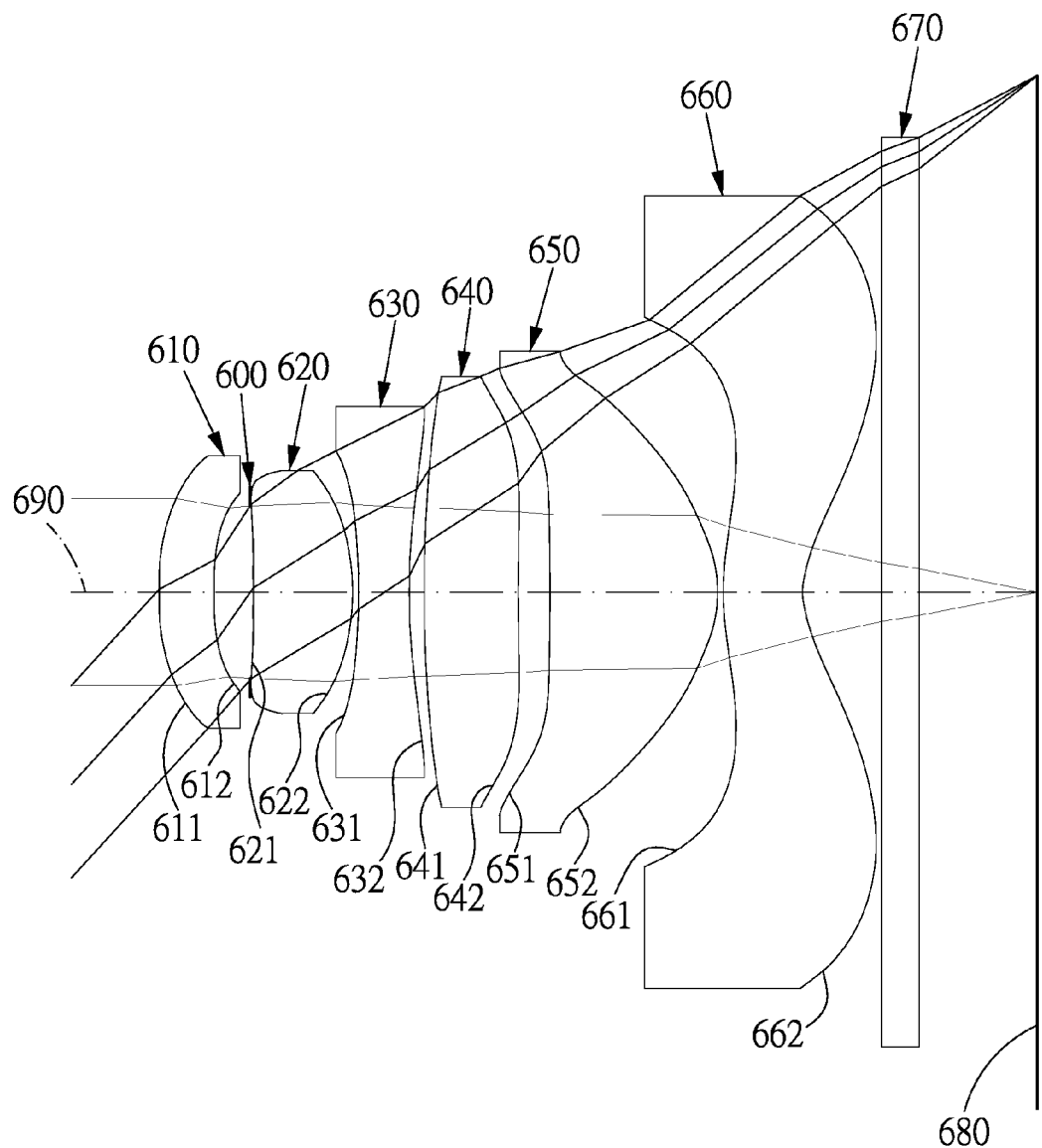
FIG. 6A shows a wide angle optical lens system in accordance with a sixth embodiment of the present invention.
Figure 6B:
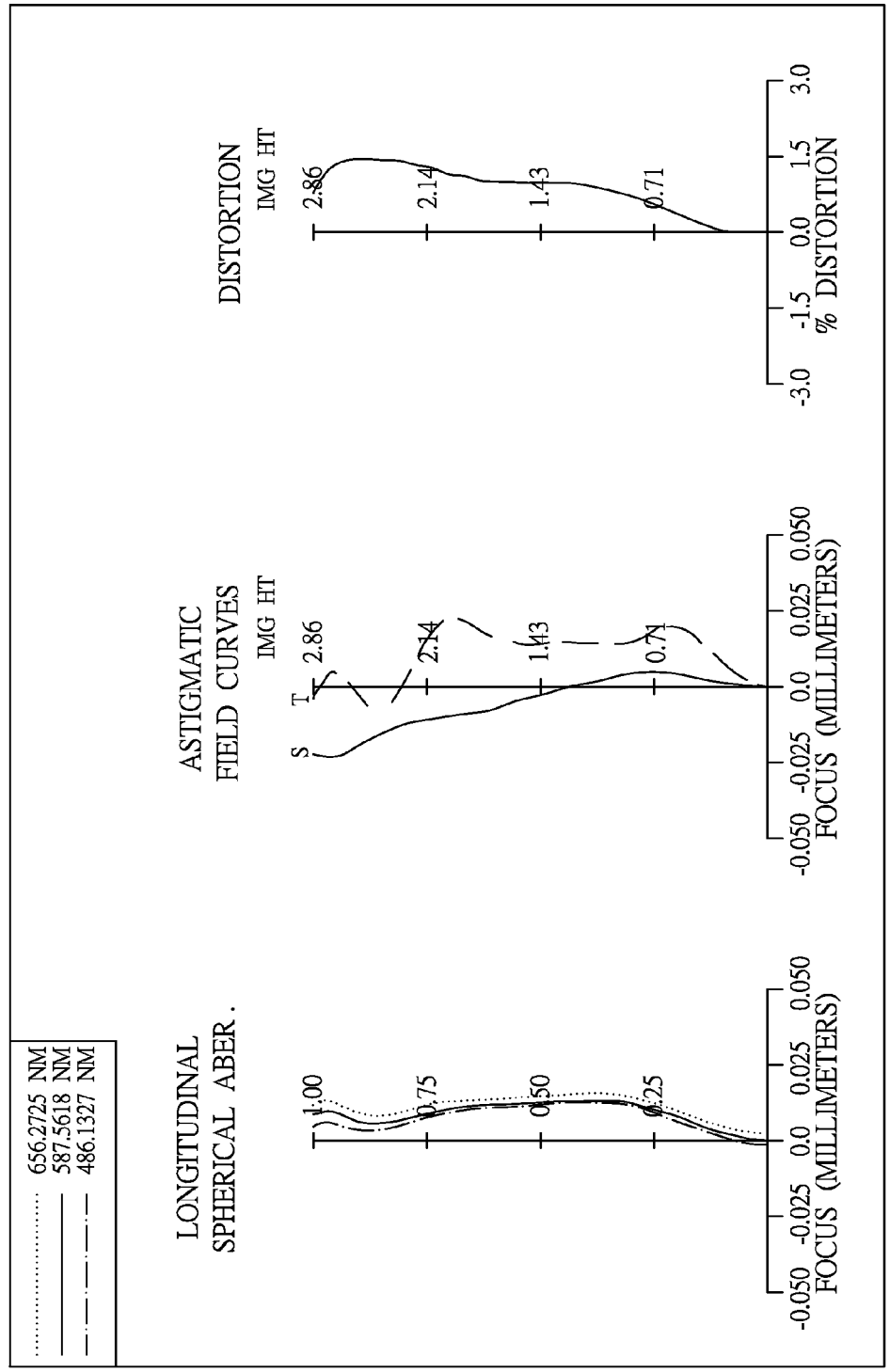
FIG. 6B shows the longitudinal spherical aberration curve, the astigmatic field curve and the distortion curve of the sixth embodiment of the present invention.

FIG. 6A shows a wide angle optical lens system in accordance with a sixth embodiment of the present invention, and FIG. 6B shows, in order from left to right, the longitudinal spherical aberration curves, the astigmatic field curves, and the distortion curve of the sixth embodiment of the present invention. A wide angle optical lens system in accordance with the sixth embodiment of the present invention comprises an aperture stop 600 and an optical assembly. The optical assembly comprises, in order from an object side to an image side: a first lens element 610, a second lens element 620, a third lens element 630, a fourth lens element 640, a fifth lens element 650, a sixth lens element 660, an IR cut filter 670 and an image plane 680, wherein the wide angle optical lens system has a total of six lens elements with refractive power. The aperture stop 600 is located between an image-side surface 612 of the first lens element 610 and an image-side surface 622 of the second lens element 620.

The first lens element 610 with a negative refractive power has an object-side surface 611 being convex near an optical axis 690 and the image-side surface 612 being concave near the optical axis 690, both the object-side and image-side surfaces 611, 612 are aspheric, and the first lens element 610 is made of plastic material.

The second lens element 620 with a positive refractive power has an object-side surface 621 being convex near the optical axis 690 and the image-side surface 622 being convex near the optical axis 690, both the object-side and image-side surfaces 621, 622 are aspheric, and the second lens element 620 is made of plastic material.

The third lens element 630 with a negative refractive power has an object-side surface 631 being concave near the optical axis 690 and an image-side surface 632 being concave near the optical axis 690, both the object-side and image-side surfaces 631, 632 are aspheric, and the third lens element 630 is made of plastic material.

The fourth lens element 640 with a positive refractive power has an object-side surface 641 being convex near the optical axis 690 and an image-side surface 642 being concave near the optical axis 690, both the object-side and image-side surfaces 641, 642 are aspheric, and the fourth lens element 640 is made of plastic material.

The fifth lens element 650 with a positive refractive power has an object-side surface 651 being concave near the optical axis 690 and an image-side surface 652 being convex near the optical axis 690, both the object-side and image-side surfaces 651, 652 are aspheric, and the fifth lens element 650 is made of plastic material.

The sixth lens element 660 with a negative refractive power has an object-side surface 661 being convex near the optical axis 690 and an image-side surface 662 being concave near the optical axis 690, both the object-side and image-side surfaces 661, 662 are aspheric, the sixth lens element 660 is made of plastic material, and more than one inflection point is formed on the object-side surface 661 and the image-side surface 662 of the sixth lens element 660.

The IR cut filter 670 made of glass is located between the sixth lens element 660 and the image plane 680 and has no influence on the focal length of the wide angle optical lens system.

The detailed optical data of the sixth embodiment is shown in Table 11 and the aspheric surface data is shown in Table 12 below.

TABLE 11

(Embodiment 6)
f(focal length) = 2.54 mm, Fno = 2.4, HFOV = 48.3 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.8141(ASP) | 0.30 | Plastic | 1.607 | 26.6 | −250 |
| 2 | | 1.6816(ASP) | 0.20 | | | | |

TABLE 11-continued (Embodiment 6)
f(focal length) = 2.54 mm, Fno = 2.4, HFOV = 48.3 deg.

| Surface | | Curvature Radius | Thickness | Material | index | Abbe # | Focal length |
|---|---|---|---|---|---|---|---|
| 3 | Aperture stop | Plane | 0.018 | | | | |
| 4 | Lens 2 | 274.3984(ASP) | 0.55 | Plastic | 1.546 | 55.9 | 2.6151 |
| 5 | | −1.4393(ASP) | 0.03 | | | | |
| 6 | Lens 3 | −6.1902(ASP) | 0.28 | Plastic | 1.607 | 26.6 | −3.3095 |
| 7 | | 3.0439(ASP) | 0.09 | | | | |
| 8 | Lens 4 | 6.0114(ASP) | 0.52 | Plastic | 1.546 | 55.9 | 39.7513 |
| 9 | | 8.0496(ASP) | 0.18 | | | | |
| 10 | Lens 5 | −14.1310(ASP) | 0.92 | Plastic | 1.546 | 55.9 | 1.4129 |
| 11 | | −0.7508(ASP) | 0.03 | | | | |
| 12 | Lens 6 | 1.5831(ASP) | 0.44 | Plastic | 1.584 | 30.0 | −1.7718 |
| 13 | | 0.5586(ASP) | 0.43 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 12

Aspheric Coefficients

| Surface # | 1 | 2 | 4 | 5 | 6 | 7 |
|---|---|---|---|---|---|---|
| K = | −3.3392 | 2.7054 | −90.0000 | 0.8249 | 55.7887 | −16.3641 |
| A4 = | 2.4844E−01 | 2.8964E−01 | −1.0152E−01 | −8.0189E−02 | −1.6117E−01 | −8.4210E−02 |
| A6 = | 3.8179E−02 | 1.6351E−01 | 1.3512E+00 | 2.3849E−02 | 2.9020E−01 | 9.3798E−02 |
| A8 = | 3.0668E−01 | −6.8934E−01 | −1.8594E+01 | −4.9554E−01 | −6.2662E−01 | 3.9482E−02 |
| A10 = | −3.4238E−01 | 1.6943E+01 | 1.1815E+02 | −1.6882E−01 | 8.4866E−01 | −2.3050E−01 |
| A12 = | 1.9265E−01 | −6.9046E+01 | −3.7074E+02 | 3.3637E−01 | −1.2214E+00 | 2.3214E−01 |
| A14 = | 6.6064E−01 | 1.1893E+02 | 4.5659E+02 | −8.4350E−01 | 1.0741E+00 | −8.4191E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −7.5305 | 22.4152 | 33.2576 | −2.9248 | −13.8134 | −3.5934 |
| A4 = | −8.3901E−02 | −1.6667E−01 | −2.9974E−02 | −1.1457E−01 | −1.3027E−01 | −1.4070E−01 |
| A6 = | 9.3841E−02 | 2.3886E−02 | −9.6850E−02 | 1.7779E−02 | −2.8491E−03 | 6.0051E−02 |
| A8 = | −5.0865E−02 | −4.0460E−02 | −6.3056E−02 | −1.6210E−02 | −2.3949E−02 | −1.7249E−02 |
| A10 = | 5.4085E−02 | −3.2161E−03 | −1.4378E−02 | −3.5244E−03 | 3.7416E−02 | 2.0238E−03 |
| A12 = | −3.7914E−02 | 2.6641E−02 | 2.3595E−02 | 2.9293E−03 | −5.8977E−03 | 4.4628E−04 |
| A14 = | 7.4181E−03 | −6.9506E−03 | 1.7737E−02 | 2.7868E−03 | −1.1229E−02 | −2.4010E−04 |
| A16 = | 0 | 0 | −9.9806E−03 | 9.3329E−05 | 5.7251E−03 | 4.1297E−05 |
| A18 = | 0 | 0 | 0 | 0 | −8.5539E−04 | −2.6422E−06 |
| A20 = | 0 | 0 | 0 | 0 | 0 | 0 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| Embodiment 6 | | | |
|---|---|---|---|
| Fno | 2.4 | ET56 | 0.50 |
| FOV | 96.7 | V6/V4 | 0.54 |
| f/f5 | 1.80 | SL2/TL2 | 0.53 |
| (R6 + R5)/(R6 − R5) | −0.34 | TTL/ImgH | 1.70 |
| tan(HFOV) | 1.12 | R10/f | −0.30 |

-continued

| Embodiment 6 | | | |
|---|---|---|---|
| (CT4 + CT5)/f | 0.57 | CT5 has the thickest thickness | Yes |
| (CT2 + T23 + CT3)/TTL | 0.18 | T45 > T34 > T56 | Yes |

Figure 7A:
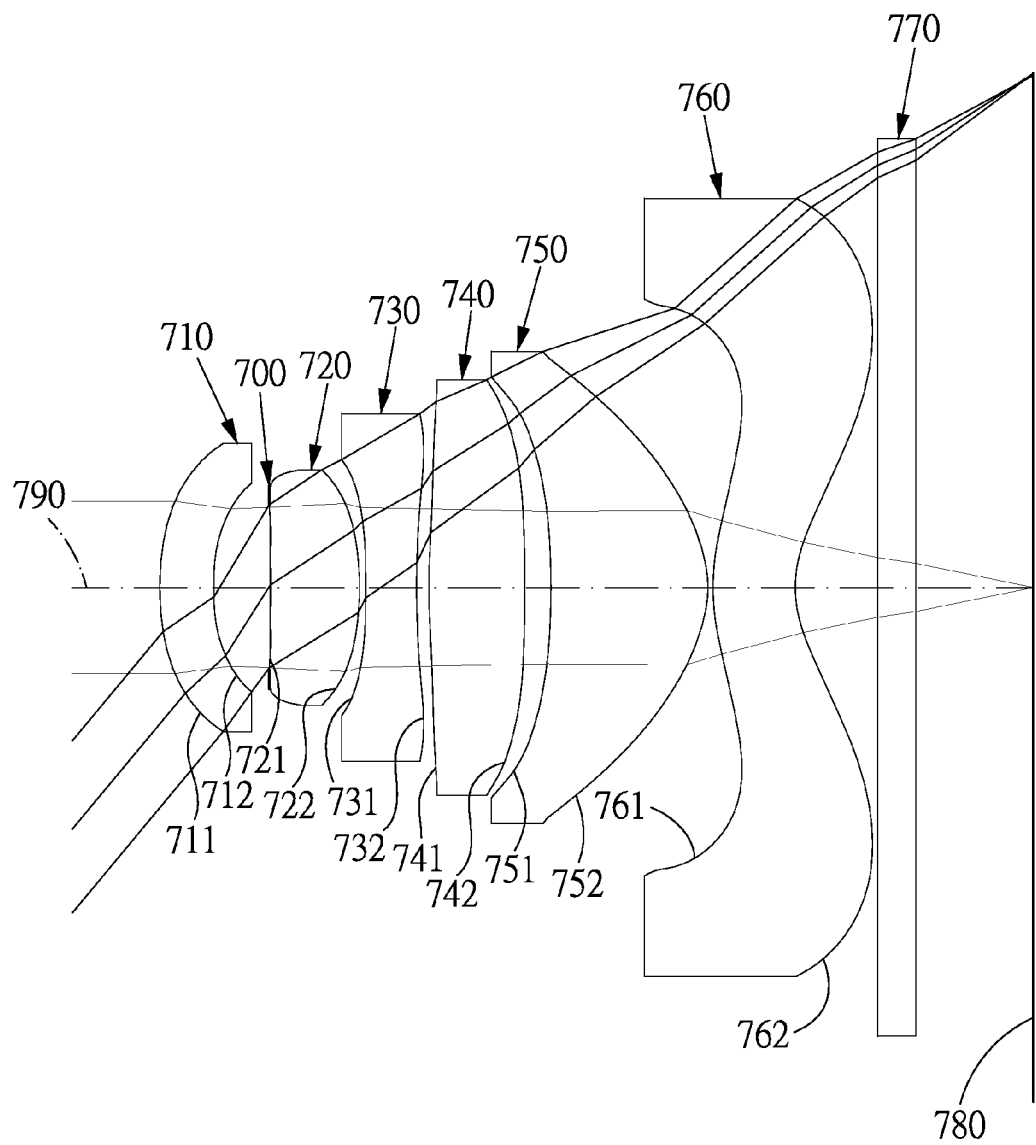
FIG. 7A shows a wide angle optical lens system in accordance with a seventh embodiment of the present invention.
Figure 7B:
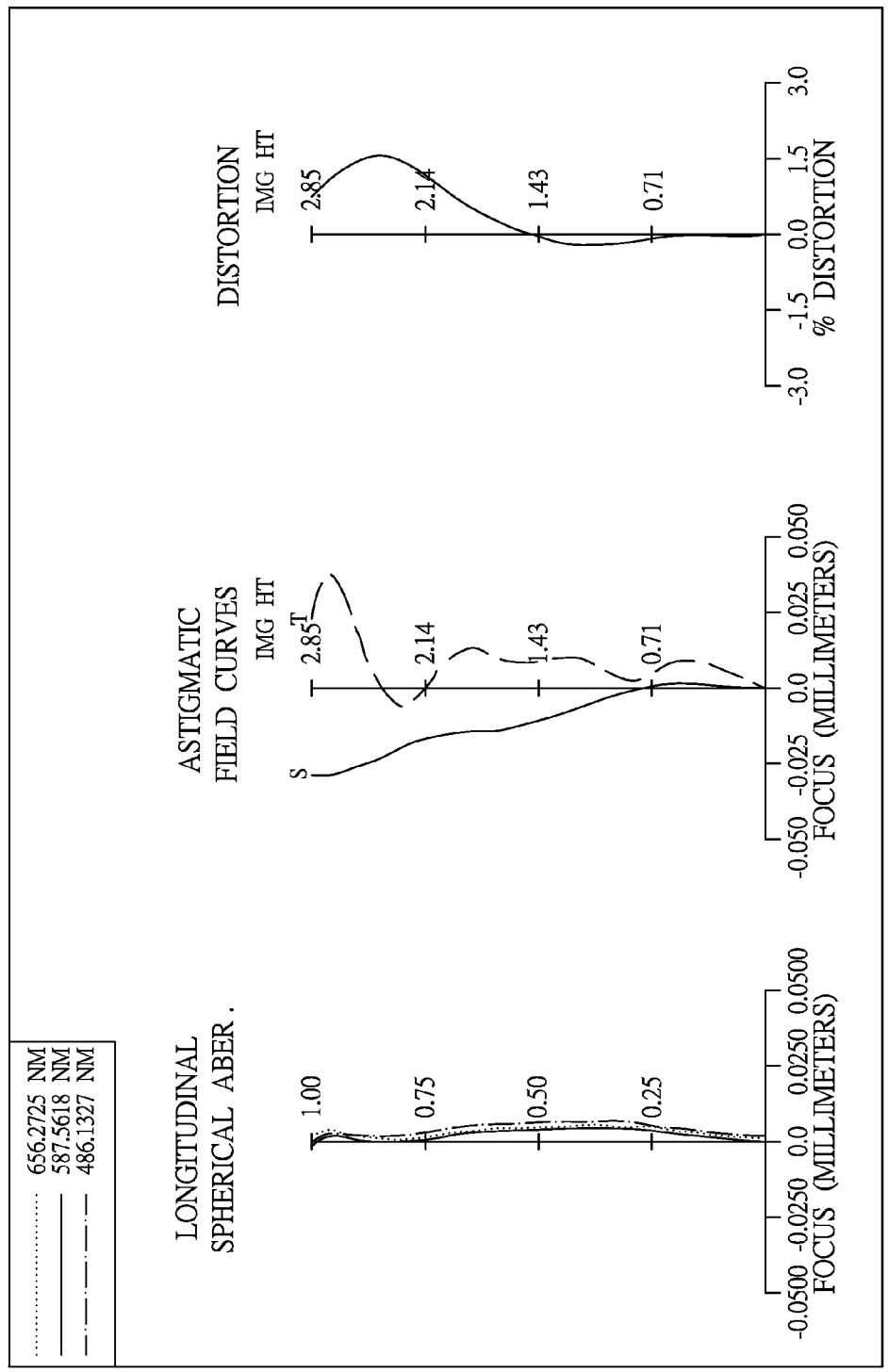
FIG. 7B shows the longitudinal spherical aberration curve, the astigmatic field curve and the distortion curve of the seventh embodiment of the present invention.

FIG. 7A shows a wide angle optical lens system in accordance with a seventh embodiment of the present invention, and FIG. 7B shows, in order from left to right, the longitudinal spherical aberration curves, the astigmatic field curves, and the distortion curve of the seventh embodiment of the present invention. A wide angle optical lens system in accordance with the seventh embodiment of the present invention comprises an aperture stop 700 and an optical assembly. The optical assembly comprises, in order from an object side to an image side: a first lens element 710, a second lens element 720, a third lens element 730, a fourth lens element 740, a fifth lens element 750, a sixth lens element 760, an IR cut filter 770 and an image plane 780, wherein the wide angle optical lens system has a total of six lens elements with refractive power. The aperture stop 700 is located between an image-side surface 712 of the first lens element 710 and an image-side surface 722 of the second lens element 720.

The first lens element 710 with a negative refractive power has an object-side surface 711 being convex near an optical axis 790 and the image-side surface 712 being concave near the optical axis 790, both the object-side and image-side surfaces 711, 712 are aspheric, and the first lens element 710 is made of plastic material.

The second lens element 720 with a positive refractive power has an object-side surface 721 being convex near the optical axis 790 and the image-side surface 722 being convex near the optical axis 790, both the object-side and image-side surfaces 721, 722 are aspheric, and the second lens element 720 is made of plastic material.

The third lens element 730 with a negative refractive power has an object-side surface 731 being concave near the optical axis 790 and an image-side surface 732 being concave near the optical axis 790, both the object-side and image-side surfaces 731, 732 are aspheric, and the third lens element 730 is made of plastic material.

The fourth lens element 740 with a positive refractive power has an object-side surface 741 being convex near the optical axis 790 and an image-side surface 742 being convex near the optical axis 790, both the object-side and image-side surfaces 741, 742 are aspheric, and the fourth lens element 740 is made of plastic material.

The fifth lens element 750 with a positive refractive power has an object-side surface 751 being concave near the optical axis 790 and an image-side surface 752 being convex near the optical axis 790, both the object-side and image-side surfaces 751, 752 are aspheric, and the fifth lens element 750 is made of plastic material.

The sixth lens element 760 with a negative refractive power has an object-side surface 761 being convex near the optical axis 790 and an image-side surface 762 being concave near the optical axis 790, both the object-side and image-side surfaces 761, 762 are aspheric, the sixth lens element 760 is made of plastic material, and more than one inflection point is formed on the object-side surface 761 and the image-side surface 762 of the sixth lens element 760.

The IR cut filter 770 made of glass is located between the sixth lens element 760 and the image plane 780 and has no influence on the focal length of the wide angle optical lens system.

The detailed optical data of the seventh embodiment is shown in Table 13 and the aspheric surface data is shown in Table 14 below.

TABLE 13

(Embodiment 7)
f(focal length) = 2.32 mm, Fno = 2.4, HFOV = 50.7 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.5845(ASP) | 0.30 | Plastic | 1.633 | 23.6 | −20 |
| 2 | | 1.3060(ASP) | 0.30 | | | | |
| 3 | Aperture stop | Plane | 0.009 | | | | |
| 4 | Lens 2 | 16.0540(ASP) | 0.50 | Plastic | 1.546 | 55.9 | 2.5116 |
| 5 | | −1.4885(ASP) | 0.03 | | | | |
| 6 | Lens 3 | −4.6927(ASP) | 0.28 | Plastic | 1.607 | 26.6 | −3.2361 |
| 7 | | 3.4887(ASP) | 0.08 | | | | |
| 8 | Lens 4 | 8.5597(ASP) | 0.52 | Plastic | 1.546 | 55.9 | 11.2974 |
| 9 | | −21.8717(ASP) | 0.15 | | | | |
| 10 | Lens 5 | −3.6726(ASP) | 0.87 | Plastic | 1.546 | 55.9 | 1.5848 |
| 11 | | −0.7610(ASP) | 0.03 | | | | |
| 12 | Lens 6 | 1.2940(ASP) | 0.46 | Plastic | 1.633 | 23.6 | −2.2731 |
| 13 | | 0.5896(ASP) | 0.46 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 14

Aspheric Coefficients

| Surface # | 1 | 2 | 4 | 5 | 6 | 7 |
|---|---|---|---|---|---|---|
| K = | −2.7830 | −6.8391 | −90.0000 | 0.9220 | 14.9787 | −51.8261 |
| A4 = | 2.5761E−01 | 7.1777E−01 | −8.6107E−02 | −8.6392E−02 | −2.2526E−01 | −9.8955E−02 |
| A6 = | 5.1068E−02 | −1.0161E−01 | 8.2461E−01 | −1.7105E−01 | 2.5461E−01 | 1.1107E−01 |
| A8 = | 2.0377E−01 | 6.9758E−01 | −1.2984E+01 | −1.5006E−01 | −5.3153E−01 | −5.3378E−03 |
| A10 = | 8.9222E−02 | 5.7219E+00 | 9.4501E+01 | −7.0626E−01 | 1.9444E−01 | −2.1776E−01 |
| A12 = | −5.1834E−01 | −1.9247E+01 | −3.5520E+02 | −2.4378E+00 | −2.4506E+00 | 2.1466E−01 |
| A14 = | 9.8030E−01 | 4.0128E+01 | 5.1530E+02 | 2.1016E+00 | 2.8406E+00 | −8.4024E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −17.0032 | 90.0000 | −55.6610 | −2.7239 | −6.0822 | −3.5101 |
| A4 = | −1.0146E−01 | −1.2115E−01 | −1.1020E−01 | −1.3449E−01 | −1.1543E−01 | −1.2208E−01 |

TABLE 14-continued

|  | Aspheric Coefficients | | | | | |
|---|---|---|---|---|---|---|
| A6 = | 1.0763E−01 | 5.3187E−02 | 2.0188E−02 | 3.3613E−02 | 4.0408E−02 | 5.6119E−02 |
| A8 = | −2.8713E−02 | −4.5800E−02 | −1.4267E−02 | −4.6607E−03 | −4.5544E−02 | −1.9300E−02 |
| A10 = | 2.5466E−02 | −4.0300E−03 | −2.7150E−02 | −6.3864E−03 | 3.2087E−02 | 2.6090E−03 |
| A12 = | −4.7849E−02 | 2.9359E−02 | 1.7017E−02 | −9.7244E−04 | −5.2266E−03 | 4.5725E−04 |
| A14 = | 1.9519E−02 | −1.2235E−02 | 1.3235E−02 | 1.9294E−03 | −8.8297E−03 | −2.2355E−04 |
| A16 = | 0 | 0 | −1.0527E−02 | 4.7070E−04 | 5.4265E−03 | 3.0121E−05 |
| A18 = | 0 | 0 | 0 | 0 | −9.6444E−04 | −1.4485E−06 |
| A20 = | 0 | 0 | 0 | 0 | 0 | 0 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| Embodiment 7 | | | |
|---|---|---|---|
| Fno | 2.4 | ET56 | 0.72 |
| FOV | 101.3 | V6/V4 | 0.42 |
| f/f5 | 1.46 | SL2/TL2 | 0.46 |
| (R6 + R5)/(R6 − R5) | −0.15 | TTL/ImgH | 1.70 |
| tan(HFOV) | 1.22 | R10/f | −0.33 |
| (CT4 + CT5)/f | 0.60 | CT5 has the thickest thickness | Yes |
| (CT2 + T23 + CT3)/TTL | 0.17 | T45 > T34 > T56 | Yes |

Figure 8A:
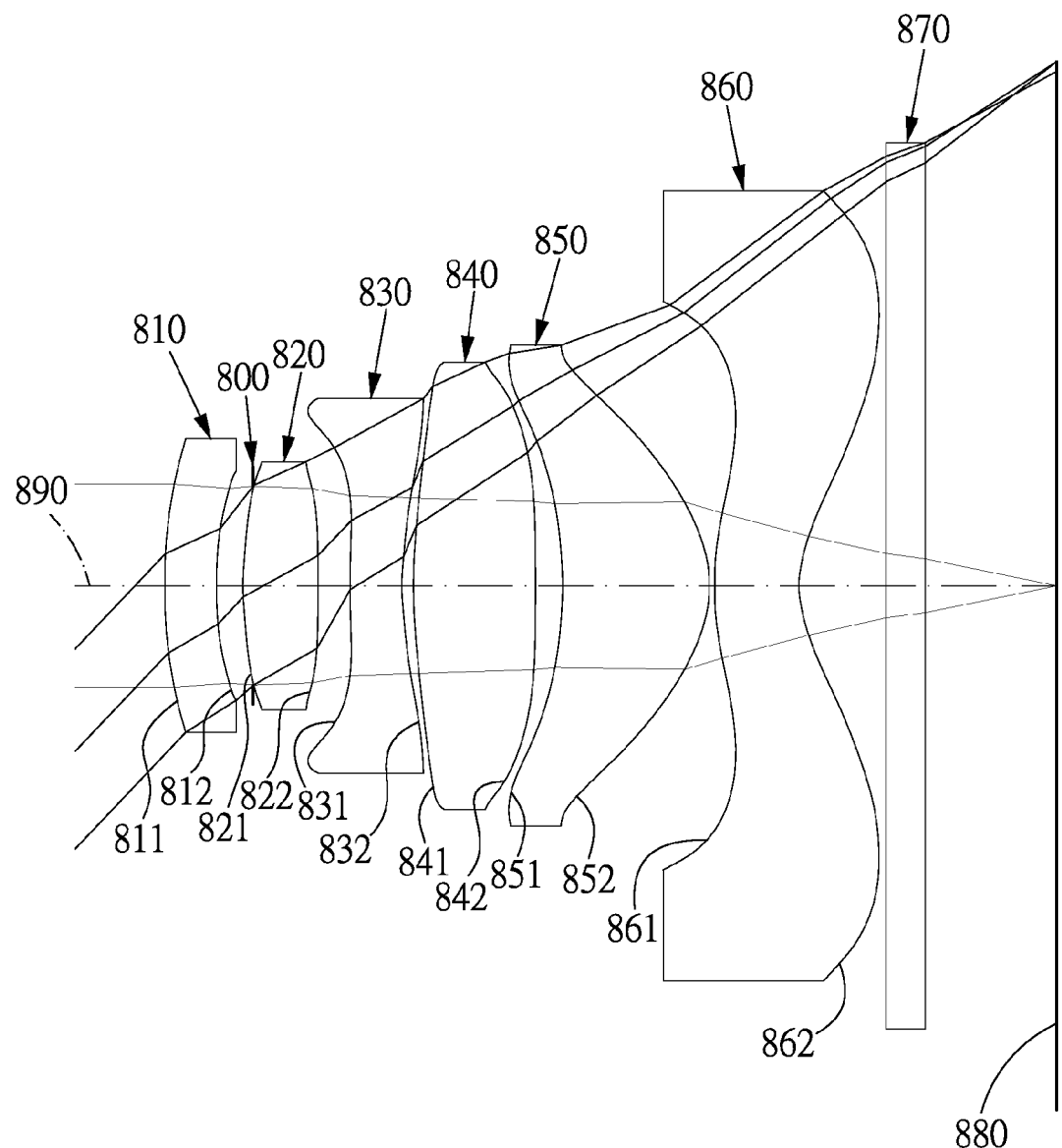
FIG. 8A shows a wide angle optical lens system in accordance with an eighth embodiment of the present invention.
Figure 8B:
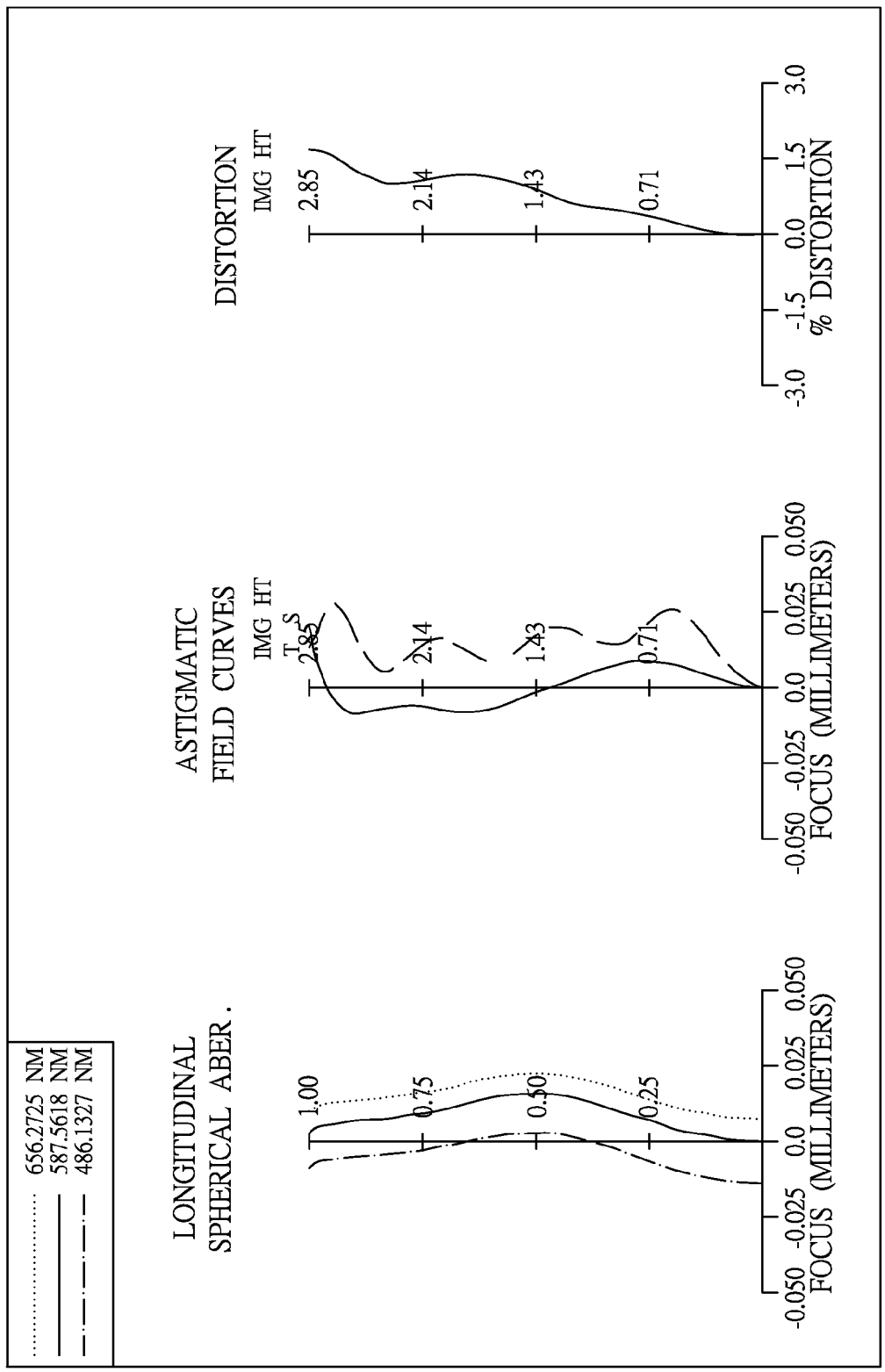
FIG. 8B shows the longitudinal spherical aberration curve, the astigmatic field curve and the distortion curve of the eighth embodiment of the present invention.

FIG. 8A shows a wide angle optical lens system in accordance with a eighth embodiment of the present invention, and FIG. 8B shows, in order from left to right, the longitudinal spherical aberration curves, the astigmatic field curves, and the distortion curve of the eighth embodiment of the present invention. A wide angle optical lens system in accordance with the eighth embodiment of the present invention comprises an aperture stop 800 and an optical assembly. The optical assembly comprises, in order from an object side to an image side: a first lens element 810, a second lens element 820, a third lens element 830, a fourth lens element 840, a fifth lens element 850, a sixth lens element 860, an IR cut filter 870 and an image plane 880, wherein the wide angle optical lens system has a total of six lens elements with refractive power. The aperture stop 800 is located between an image-side surface 812 of the first lens element 810 and an image-side surface 822 of the second lens element 820.

The first lens element 810 with a negative refractive power has an object-side surface 811 being convex near an optical axis 890 and the image-side surface 812 being concave near the optical axis 890, both the object-side and image-side surfaces 811, 812 are aspheric, and the first lens element 810 is made of plastic material.

The second lens element 820 with a positive refractive power has an object-side surface 821 being convex near the optical axis 890 and the image-side surface 822 being convex near the optical axis 890, both the object-side and image-side surfaces 821, 822 are aspheric, and the second lens element 820 is made of plastic material.

The third lens element 830 with a negative refractive power has an object-side surface 831 being convex near the optical axis 890 and an image-side surface 832 being concave near the optical axis 890, both the object-side and image-side surfaces 831, 832 are aspheric, and the third lens element 830 is made of plastic material.

The fourth lens element 840 with a positive refractive power has an object-side surface 841 being convex near the optical axis 890 and an image-side surface 842 being convex near the optical axis 890, both the object-side and image-side surfaces 841, 842 are aspheric, and the fourth lens element 840 is made of plastic material.

The fifth lens element 850 with a positive refractive power has an object-side surface 851 being concave near the optical axis 890 and an image-side surface 852 being convex near the optical axis 890, both the object-side and image-side surfaces 851, 852 are aspheric, and the fifth lens element 850 is made of plastic material.

The sixth lens element 860 with a negative refractive power has an object-side surface 861 being convex near the optical axis 890 and an image-side surface 862 being concave near the optical axis 890, both the object-side and image-side surfaces 861, 862 are aspheric, the sixth lens element 860 is made of plastic material, and more than one inflection point is formed on the object-side surface 861 and the image-side surface 862 of the sixth lens element 860.

The IR cut filter 870 made of glass is located between the sixth lens element 860 and the image plane 880 and has no influence on the focal length of the wide angle optical lens system.

The detailed optical data of the eighth embodiment is shown in Table 15 and the aspheric surface data is shown in Table 16 below.

TABLE 15

(Embodiment 8)
f(focal length) = 2.69 mm, Fno = 2.4, HFOV = 46.4 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 3.3090(ASP) | 0.28 | Plastic | 1.633 | 23.6 | −20 |
| 2 | | 2.5432(ASP) | 0.19 | | | | |
| 3 | Aperture stop | Plane | −0.045 | | | | |
| 4 | Lens 2 | 3.0325(ASP) | 0.41 | Plastic | 1.584 | 30.0 | 3.3968 |

TABLE 15-continued (Embodiment 8)
f(focal length) = 2.69 mm, Fno = 2.4, HFOV = 46.4 deg.

| Surface | | Curvature Radius | Thickness | Material | index | Abbe # | Focal length |
|---|---|---|---|---|---|---|---|
| 5 | | −5.5019(ASP) | 0.18 | | | | |
| 6 | Lens 3 | 24.6550(ASP) | 0.28 | Plastic | 1.633 | 23.6 | −3.9697 |
| 7 | | 2.2962(ASP) | 0.06 | | | | |
| 8 | Lens 4 | 3.8570(ASP) | 0.66 | Plastic | 1.546 | 55.9 | 6.1740 |
| 9 | | −25.8299(ASP) | 0.14 | | | | |
| 10 | Lens 5 | −2.6766(ASP) | 0.80 | Plastic | 1.546 | 55.9 | 1.5640 |
| 11 | | −0.7178(ASP) | 0.03 | | | | |
| 12 | Lens 6 | 1.5474(ASP) | 0.46 | Plastic | 1.584 | 30.0 | −1.9581 |
| 13 | | 0.5872(ASP) | 0.48 | | | | |
| 14 | IR-filter | Plane | 0.21 | Glass | 1.517 | 64.0 | — |
| 15 | | Plane | 0.71 | | | | |
| 16 | Image | Plane | — | | | | |

TABLE 16

Aspheric Coefficients

| Surface # | 1 | 2 | 4 | 5 | 6 | 7 |
|---|---|---|---|---|---|---|
| K = | −27.5727 | −38.0215 | 20.6272 | 29.5100 | 90.0000 | −9.8096 |
| A4 = | 1.2790E−01 | 3.7416E−01 | −9.1045E−02 | −1.3170E−01 | −2.8641E−01 | −9.9925E−02 |
| A6 = | −9.0409E−02 | −4.5739E−01 | −7.0338E−03 | −9.8717E−02 | 5.9445E−02 | 1.0874E−01 |
| A8 = | 6.2955E−02 | −1.5331E−01 | −4.6481E−01 | 5.0071E−01 | −2.7449E−01 | 1.6831E−02 |
| A10 = | 6.9581E−02 | 7.2213E+00 | 4.1300E−01 | −9.6339E−01 | 3.2752E−01 | −2.2043E−01 |
| A12 = | −2.4430E−01 | −2.1387E+01 | 2.2963E+00 | −5.2891E−02 | −8.4864E−01 | 2.1069E−01 |
| A14 = | 1.6838E−01 | 2.2394E+01 | −8.5816E+00 | 2.4325E+00 | 7.8726E−01 | −6.6593E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −20.5953 | 90.0000 | 2.7422 | −2.5764 | −13.1454 | −3.8436 |
| A4 = | −7.7889E−02 | −1.3842E−01 | −4.1408E−02 | −1.3680E−01 | −6.8150E−02 | −1.0136E−01 |
| A6 = | 1.1069E−01 | 7.1801E−02 | 3.5906E−02 | 2.6145E−02 | 2.5032E−02 | 4.4075E−02 |
| A8 = | −3.8361E−02 | −6.5479E−02 | −1.1134E−02 | 1.4364E−03 | −3.4796E−02 | −1.4962E−02 |
| A10 = | 2.0520E−02 | −6.1438E−03 | −1.1672E−02 | −3.5151E−03 | 3.4012E−02 | 2.3353E−03 |
| A12 = | −5.0123E−02 | 2.4893E−02 | 1.6051E−02 | 2.5408E−03 | −5.7377E−03 | 1.5151E−04 |
| A14 = | 2.5236E−02 | −4.8550E−03 | 1.1050E−02 | 3.4920E−03 | −9.4097E−03 | −1.4992E−04 |
| A16 = | 0 | 0 | −6.3297E−03 | −3.9993E−04 | 5.2798E−03 | 2.8531E−05 |
| A18 = | 0 | 0 | 0 | 0 | −8.3598E−04 | −1.9760E−06 |
| A20 = | 0 | 0 | 0 | 0 | 0 | 0 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| Embodiment 8 | | | |
|---|---|---|---|
| Fno | 2.4 | ET56 | 0.59 |
| FOV | 92.8 | V6/V4 | 0.54 |
| f/f5 | 1.72 | SL2/TL2 | 0.43 |
| (R6 + R5)/(R6 − R5) | −1.21 | TTL/ImgH | 1.70 |
| tan(HFOV) | 1.05 | R10/f | −0.27 |
| (CT4 + CT5)/f | 0.54 | CT5 has the thickest thickness | Yes |
| (CT2 + T23 + CT3)/TTL | 0.18 | T45 > T34 > T56 | Yes |

Figure 9A:
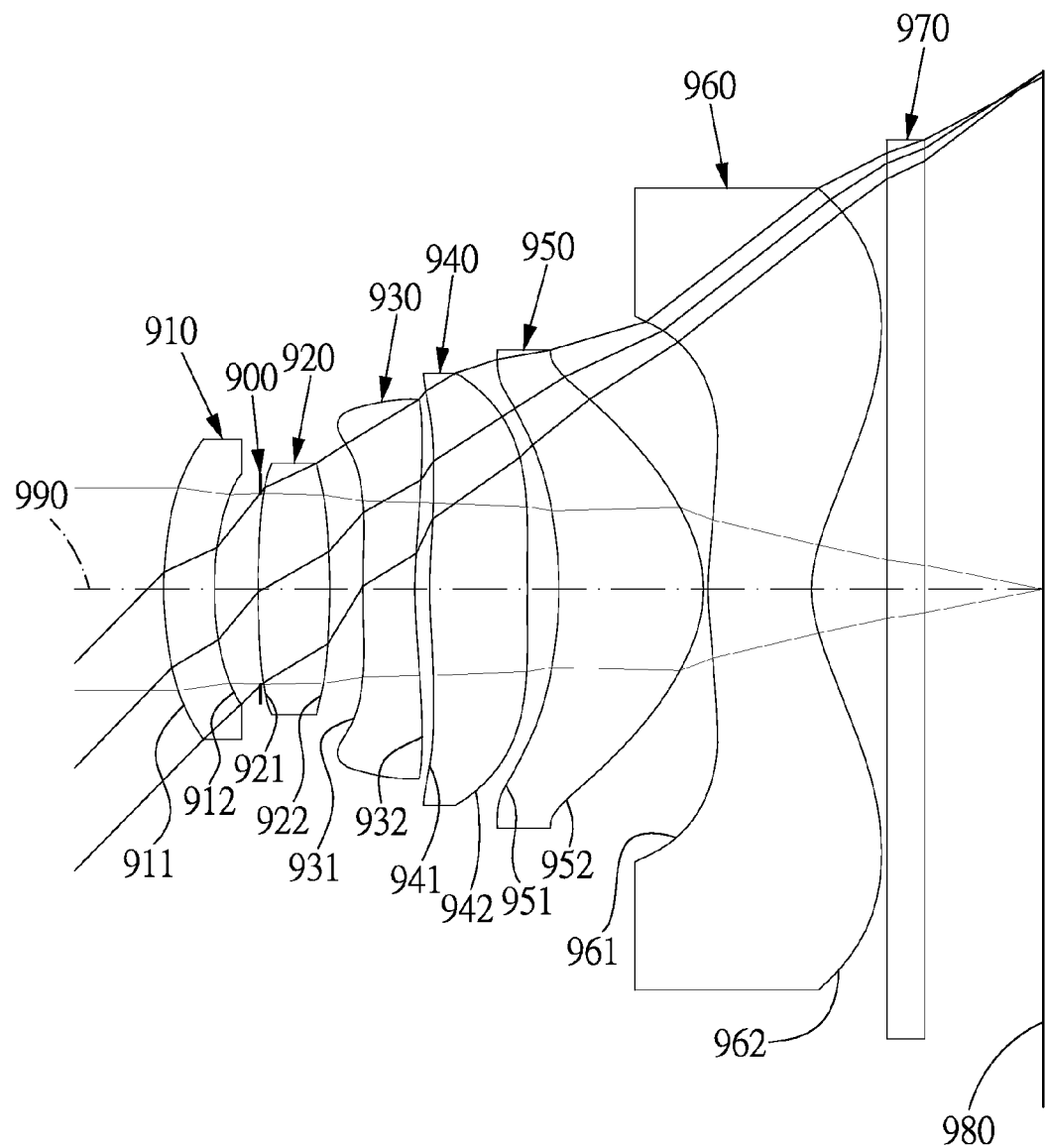
FIG. 9A shows a wide angle optical lens system in accordance with a ninth embodiment of the present invention.
Figure 9B:
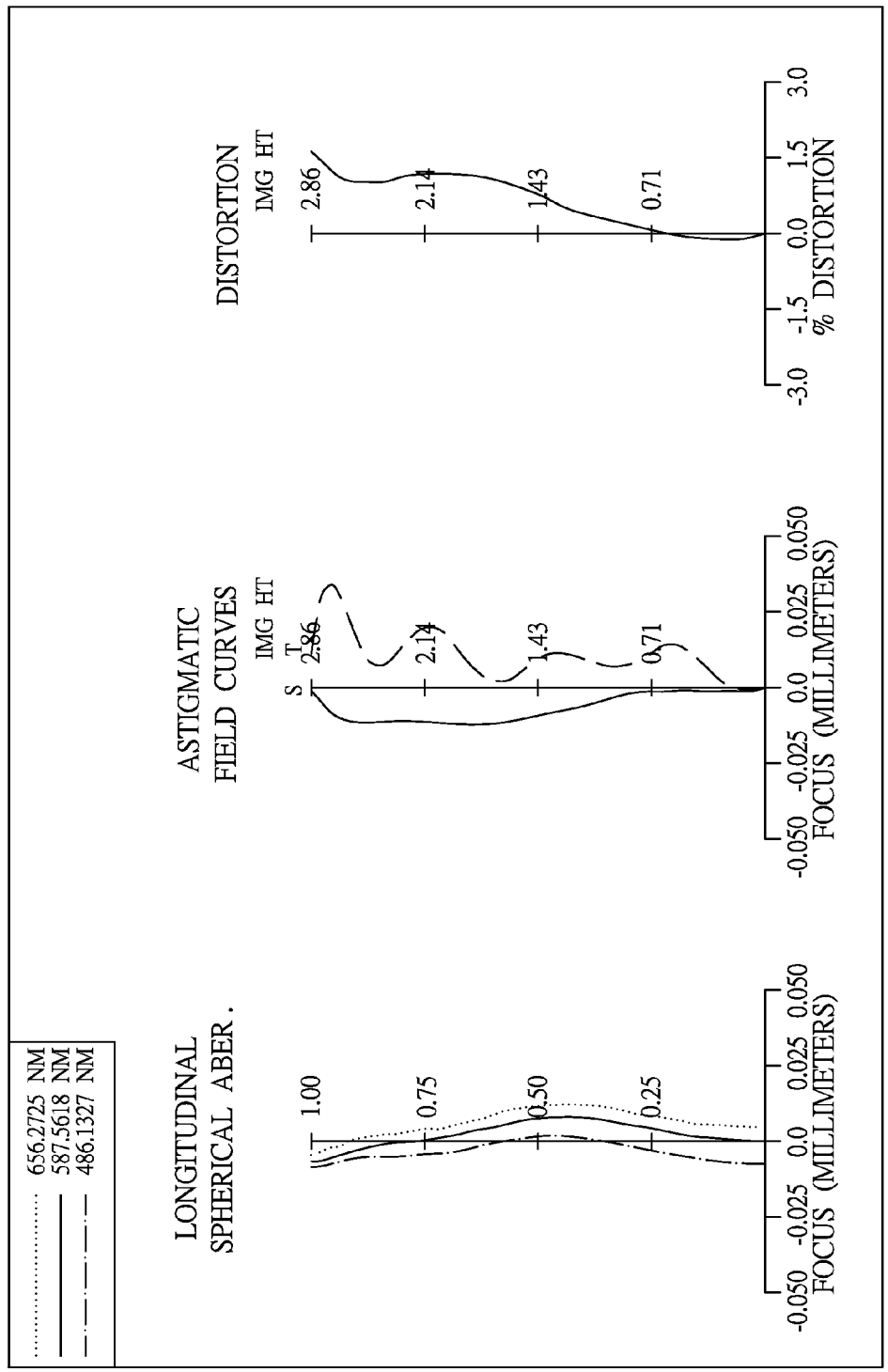
FIG. 9B shows the longitudinal spherical aberration curve, the astigmatic field curve and the distortion curve of the ninth embodiment of the present invention.

FIG. 9A shows a wide angle optical lens system in accordance with a ninth embodiment of the present invention, and FIG. 9B shows, in order from left to right, the longitudinal spherical aberration curves, the astigmatic field curves, and the distortion curve of the ninth embodiment of the present invention. A wide angle optical lens system in accordance with the ninth embodiment of the present invention comprises an aperture stop 900 and an optical assembly. The optical assembly comprises, in order from an object side to an image side: a first lens element 910, a second lens element 920, a third lens element 930, a fourth lens element 940, a fifth lens element 950, a sixth lens element 960, an IR cut filter 970 and an image plane 980, wherein the wide angle optical lens system has a total of six lens elements with refractive power. The aperture stop 900 is located between an image-side surface 912 of the first lens element 910 and an image-side surface 922 of the second lens element 920.

The first lens element 910 with a negative refractive power has an object-side surface 911 being convex near an optical axis 990 and the image-side surface 912 being concave near the optical axis 990, both the object-side and image-side surfaces 911, 912 are aspheric, and the first lens element 910 is made of plastic material.

The second lens element 920 with a positive refractive power has an object-side surface 921 being convex near the optical axis 990 and the image-side surface 922 being convex near the optical axis 990, both the object-side and image-side surfaces 921, 922 are aspheric, and the second lens element 920 is made of plastic material.

The third lens element 930 with a negative refractive power has an object-side surface 931 being convex near the optical axis 990 and an image-side surface 932 being concave near the optical axis 990, both the object-side and image-side surfaces 931, 932 are aspheric, and the third lens element 930 is made of plastic material.

The fourth lens element 940 with a positive refractive power has an object-side surface 941 being convex near the optical axis 990 and an image-side surface 942 being convex near the optical axis 990, both the object-side and image-side surfaces 941, 942 are aspheric, and the fourth lens element 940 is made of plastic material.

The fifth lens element 950 with a positive refractive power has an object-side surface 951 being concave near the optical axis 990 and an image-side surface 952 being convex near the optical axis 990, both the object-side and image-side surfaces 951, 952 are aspheric, and the fifth lens element 950 is made of plastic material.

The sixth lens element 960 with a negative refractive power has an object-side surface 961 being convex near the optical axis 990 and an image-side surface 962 being concave near the optical axis 990, both the object-side and image-side surfaces 961, 962 are aspheric, the sixth lens element 960 is made of plastic material, and more than one inflection point is formed on the object-side surface 961 and the image-side surface 962 of the sixth lens element 960.

The IR cut filter 970 made of glass is located between the sixth lens element 960 and the image plane 980 and has no influence on the focal length of the wide angle optical lens system.

The detailed optical data of the ninth embodiment is shown in Table 17 and the aspheric surface data is shown in Table 18 below.

TABLE 17

(Embodiment 9)
f(focal length) = 2.72 mm, Fno = 2.4, HFOV = 46.0 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 2.1681(ASP) | 0.28 | Plastic | 1.633 | 23.6 | −500 |
| 2 | | 2.0449(ASP) | 0.25 | | | | |
| 3 | Aperture stop | Plane | −0.011 | | | | |
| 4 | Lens 2 | 4.0498(ASP) | 0.40 | Plastic | 1.584 | 30.0 | 4.8928 |
| 5 | | −7.6531(ASP) | 0.19 | | | | |
| 6 | Lens 3 | 10.8736(ASP) | 0.28 | Plastic | 1.633 | 23.6 | −6.2365 |
| 7 | | 2.8603(ASP) | 0.08 | | | | |
| 8 | Lens 4 | 4.0353(ASP) | 0.54 | Plastic | 1.546 | 55.9 | 7.0402 |
| 9 | | −83.2787(ASP) | 0.17 | | | | |
| 10 | Lens 5 | −2.7979(ASP) | 0.80 | Plastic | 1.546 | 55.9 | 1.5620 |
| 11 | | −0.7216(ASP) | 0.03 | | | | |
| 12 | Lens 6 | 2.5788(ASP) | 0.57 | Plastic | 1.584 | 30.0 | −1.8117 |
| 13 | | 0.6868(ASP) | 0.42 | | | | |
| 14 | IR-filter | Plane | 0.21 | Glass | 1.517 | 64.0 | — |
| 15 | | Plane | 0.71 | | | | |
| 16 | Image | Plane | — | | | | |

TABLE 18

Aspheric Coefficients

| Surface # | 1 | 2 | 4 | 5 | 6 | 7 |
|---|---|---|---|---|---|---|
| K = | −9.1166 | −21.9448 | 23.3383 | 44.6241 | −37.9400 | −27.3714 |
| A4 = | 1.7763E−01 | 4.5244E−01 | −6.9890E−02 | −2.1083E−01 | −3.2223E−01 | −1.5076E−01 |
| A6 = | −4.2285E−02 | −4.6167E−01 | 8.1644E−02 | −1.5440E−02 | 1.2460E−01 | 1.1481E−01 |
| A8 = | 5.7960E−02 | 1.9347E−02 | −3.0414E−01 | 2.3401E−01 | −3.2664E−01 | 2.9064E−02 |
| A10 = | 5.4966E−02 | 7.2661E+00 | 3.1113E−01 | −5.3247E−01 | 4.5027E−01 | −2.2308E−01 |
| A12 = | −9.1602E−02 | −2.2227E+01 | 2.4803E+00 | −3.3047E−01 | −8.8653E−01 | 2.0634E−01 |
| A14 = | 7.9427E−02 | 2.4994E+01 | −2.3518E+00 | 2.8345E+00 | 8.6577E−01 | −5.9608E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −50.7008 | 70.5033 | 2.9781 | −2.5151 | −31.5885 | −4.4984 |
| A4 = | −1.4034E−01 | −1.6598E−01 | −5.3793E−02 | −1.3354E−01 | −7.0265E−02 | −9.0627E−02 |
| A6 = | 9.9511E−02 | 6.1889E−02 | 2.8558E−02 | 2.4722E−02 | 1.3595E−03 | 4.0014E−02 |
| A8 = | −4.0486E−02 | −7.1146E−02 | −1.3589E−02 | −6.1274E−04 | −3.5543E−02 | −1.4793E−02 |
| A10 = | 2.0316E−02 | −7.6095E−04 | −1.2893E−02 | −3.9081E−03 | 3.1872E−02 | 2.6368E−03 |
| A12 = | −4.8993E−02 | 2.4962E−02 | 1.5805E−02 | 2.7015E−03 | −5.3061E−03 | 1.3750E−04 |
| A14 = | 2.6645E−02 | −1.1854E−02 | 1.1239E−02 | 3.4576E−03 | −9.0133E−03 | −1.6205E−04 |
| A16 = | 0 | 0 | −6.1097E−03 | −6.6239E−04 | 5.3569E−03 | 2.8138E−05 |

TABLE 18-continued

| Aspheric Coefficients | | | | | | |
|---|---|---|---|---|---|---|
| A18 = | 0 | 0 | 0 | 0 | −9.4218E−04 | −1.6489E−06 |
| A20 = | 0 | 0 | 0 | 0 | 0 | 0 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| Embodiment 9 | | | |
|---|---|---|---|
| Fno | 2.4 | ET56 | 0.52 |
| FOV | 92.0 | V6/V4 | 0.54 |
| f/f5 | 1.74 | SL2/TL2 | 0.42 |
| (R6 + R5)/(R6 − R5) | −1.71 | TTL/ImgH | 1.70 |
| tan(HFOV) | 1.04 | R10/f | −0.27 |
| (CT4 + CT5)/f | 0.49 | CT5 has the thickest thickness | Yes |
| (CT2 + T23 + CT3)/TTL | 0.18 | T45 > T34 > T56 | Yes |

Figure 10A:
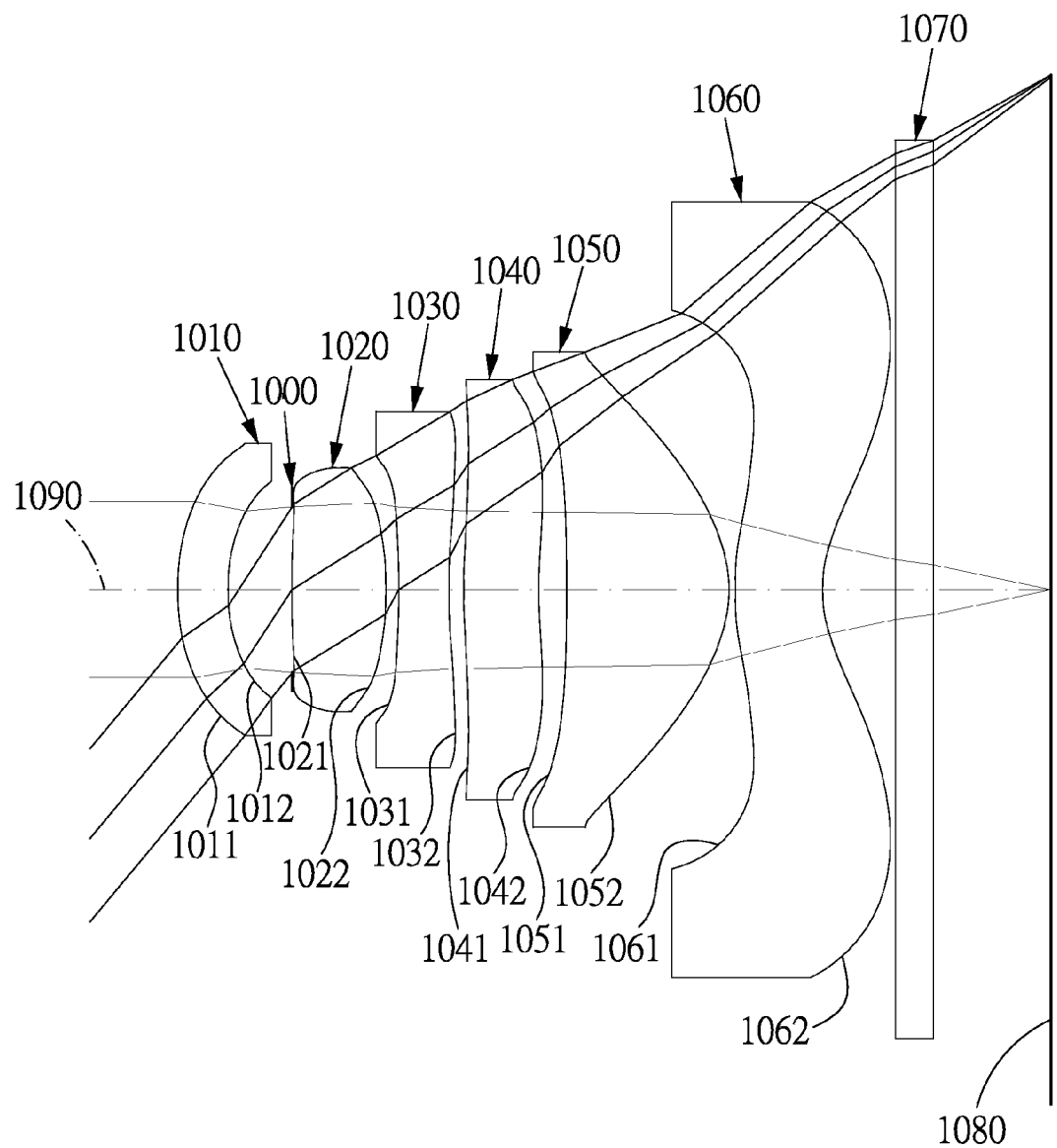
FIG. 10A shows a wide angle optical lens system in accordance with a tenth embodiment of the present invention.
Figure 10B:
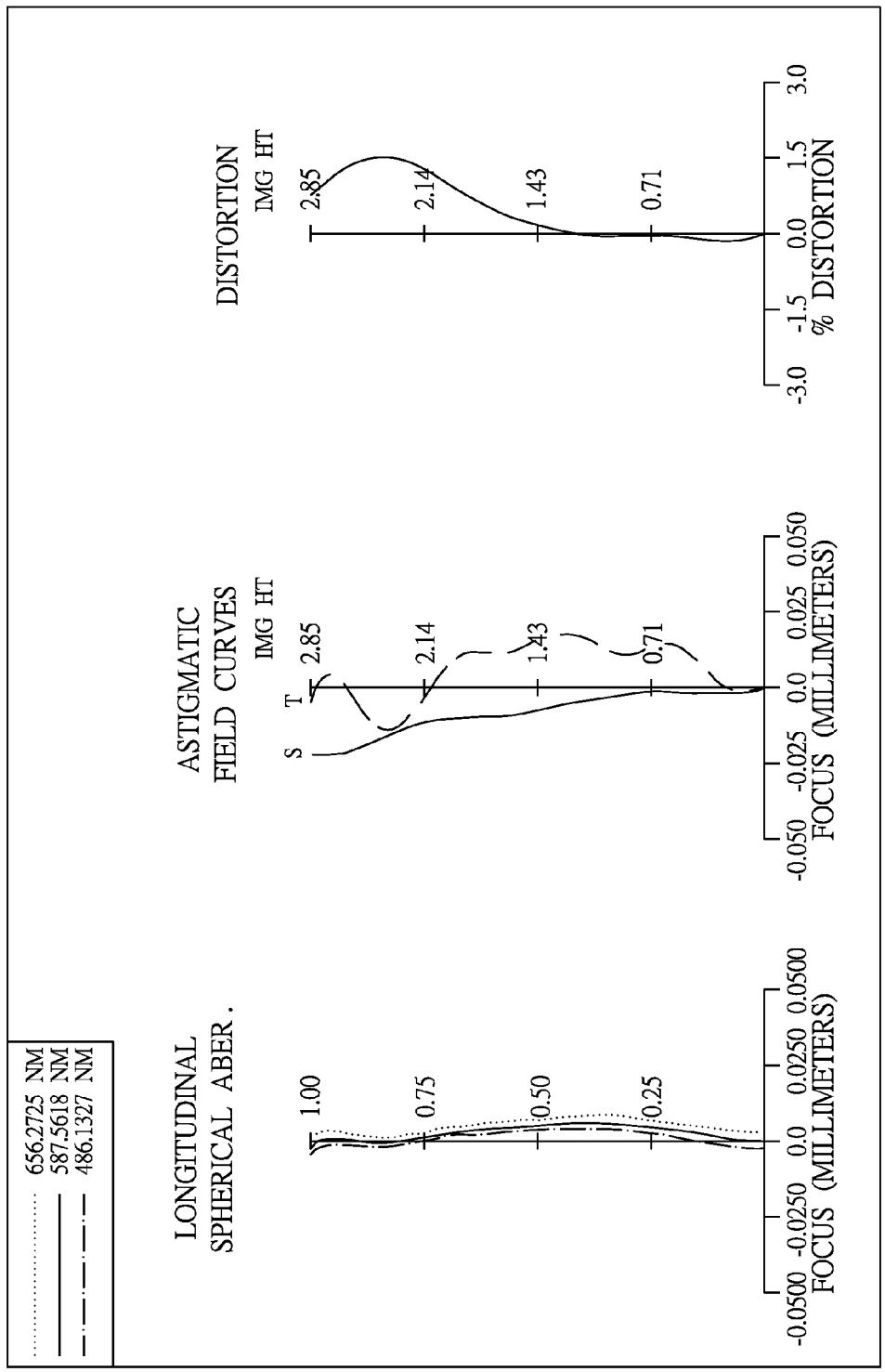
FIG. 10B shows the longitudinal spherical aberration curve, the astigmatic field curve and the distortion curve of the tenth embodiment of the present invention.

FIG. 10A shows a wide angle optical lens system in accordance with a tenth embodiment of the present invention, and FIG. 10B shows, in order from left to right, the longitudinal spherical aberration curves, the astigmatic field curves, and the distortion curve of the tenth embodiment of the present invention. A wide angle optical lens system in accordance with the tenth embodiment of the present invention comprises an aperture stop 1000 and an optical assembly. The optical assembly comprises, in order from an object side to an image side: a first lens element 1010, a second lens element 1020, a third lens element 1030, a fourth lens element 1040, a fifth lens element 1050, a sixth lens element 1060, an IR cut filter 1070 and an image plane 1080, wherein the wide angle optical lens system has a total of six lens elements with refractive power. The aperture stop 1000 is located between an image-side surface 1012 of the first lens element 1010 and an image-side surface 1022 of the second lens element 1020.

The first lens element 1010 with a negative refractive power has an object-side surface 1011 being convex near an optical axis 1090 and the image-side surface 1012 being concave near the optical axis 1090, both the object-side and image-side surfaces 1011, 1012 are aspheric, and the first lens element 1010 is made of plastic material.

The second lens element 1020 with a positive refractive power has an object-side surface 1021 being convex near the optical axis 1090 and the image-side surface 1022 being convex near the optical axis 1090, both the object-side and image-side surfaces 1021, 1022 are aspheric, and the second lens element 1020 is made of plastic material.

The third lens element 1030 with a negative refractive power has an object-side surface 1031 being concave near the optical axis 1090 and an image-side surface 1032 being concave near the optical axis 1090, both the object-side and image-side surfaces 1031, 1032 are aspheric, and the third lens element 1030 is made of plastic material.

The fourth lens element 1040 with a negative refractive power has an object-side surface 1041 being convex near the optical axis 1090 and an image-side surface 1042 being concave near the optical axis 1090, both the object-side and image-side surfaces 1041, 1042 are aspheric, and the fourth lens element 1040 is made of plastic material.

The fifth lens element 1050 with a positive refractive power has an object-side surface 1051 being concave near the optical axis 1090 and an image-side surface 1052 being convex near the optical axis 1090, both the object-side and image-side surfaces 1051, 1052 are aspheric, and the fifth lens element 1050 is made of plastic material.

The sixth lens element 1060 with a negative refractive power has an object-side surface 1061 being convex near the optical axis 1090 and an image-side surface 1062 being concave near the optical axis 1090, both the object-side and image-side surfaces 1061, 1062 are aspheric, the sixth lens element 1060 is made of plastic material, and more than one inflection point is formed on the object-side surface 1061 and the image-side surface 1062 of the sixth lens element 1060.

The IR cut filter 1070 made of glass is located between the sixth lens element 1060 and the image plane 1080 and has no influence on the focal length of the wide angle optical lens system.

The detailed optical data of the tenth embodiment is shown in Table 19 and the aspheric surface data is shown in Table 20 below.

TABLE 19

(Embodiment 10)
f(focal length) = 2.37 mm, Fno = 2.4, HFOV = 50.1 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.4564(ASP) | 0.28 | Plastic | 1.633 | 23.6 | −20 |
| 2 | | 1.2088(ASP) | 0.36 | | | | |
| 3 | Aperture stop | Plane | 0.001 | | | | |
| 4 | Lens 2 | 8.7190(ASP) | 0.52 | Plastic | 1.546 | 55.9 | 3.2795 |
| 5 | | −2.2155(ASP) | 0.07 | | | | |
| 6 | Lens 3 | −21.9448(ASP) | 0.28 | Plastic | 1.607 | 26.6 | −5.2221 |
| 7 | | 3.7988(ASP) | 0.08 | | | | |
| 8 | Lens 4 | 4.3178(ASP) | 0.42 | Plastic | 1.546 | 55.9 | −210.7608 |
| 9 | | 4.0199(ASP) | 0.16 | | | | |
| 10 | Lens 5 | −12.8593(ASP) | 0.90 | Plastic | 1.546 | 55.9 | 1.4166 |

TABLE 19-continued (Embodiment 10)
f(focal length) = 2.37 mm, Fno = 2.4, HFOV = 50.1 deg.

| Surface | | Curvature Radius | Thickness | Material | index | Abbe # | Focal length |
|---|---|---|---|---|---|---|---|
| 11 | | −0.7501(ASP) | 0.03 | | | | |
| 12 | Lens 6 | 1.6155(ASP) | 0.49 | Plastic | 1.633 | 23.6 | −2.0498 |
| 13 | | 0.6356(ASP) | 0.41 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 20

Aspheric Coefficients

| Surface # | 1 | 2 | 4 | 5 | 6 | 7 |
|---|---|---|---|---|---|---|
| K = | −1.7500 | −5.2811 | −90.0000 | −5.0705 | 90.0000 | −29.7447 |
| A4 = | 2.2657E−01 | 6.7812E−01 | −6.6230E−02 | −4.0083E−01 | −3.5730E−01 | −1.2411E−01 |
| A6 = | 9.8238E−02 | −1.9647E−02 | 9.0505E−01 | 1.0620E−01 | 3.1322E−01 | 1.1921E−01 |
| A8 = | 7.1093E−02 | 3.2461E−01 | −1.3848E+01 | −1.3334E−01 | −5.1435E−01 | 1.5403E−02 |
| A10 = | 2.1943E−01 | 5.0957E+00 | 9.5688E+01 | −7.7980E−01 | 4.7447E−01 | −2.2539E−01 |
| A12 = | −2.9077E−01 | −1.2947E+01 | −3.3263E+02 | −6.7400E−01 | −1.2694E+00 | 1.8761E−01 |
| A14 = | 4.8230E−01 | 2.1066E+01 | 4.4850E+02 | 1.2968E−01 | 4.4296E−01 | −6.3128E−02 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −90.0000 | −88.0072 | 16.8133 | −2.7529 | −9.3934 | −3.9914 |
| A4 = | −1.2766E−01 | −1.4020E−01 | −4.4308E−02 | −1.2598E−01 | −1.0446E−01 | −1.1757E−01 |
| A6 = | 1.1535E−01 | 5.9572E−02 | 1.3845E−02 | 4.2435E−02 | 2.9846E−02 | 5.2044E−02 |
| A8 = | −3.2095E−02 | −6.1393E−02 | −2.0256E−02 | 5.9256E−06 | −4.1302E−02 | −1.7345E−02 |
| A10 = | 2.4423E−02 | −1.1828E−02 | −1.9961E−02 | −5.0418E−03 | 3.1394E−02 | 2.2571E−03 |
| A12 = | −4.6993E−02 | 3.1236E−02 | 1.1319E−02 | 7.4289E−04 | −5.3408E−03 | 4.3815E−04 |
| A14 = | 1.9552E−02 | −7.7048E−03 | 1.0077E−02 | 1.6426E−03 | −8.7836E−03 | −2.1561E−04 |
| A16 = | 0 | 0 | −5.1092E−03 | −1.2961E−04 | 5.4437E−03 | 3.0977E−05 |
| A18 = | 0 | 0 | 0 | 0 | −9.8760E−04 | −1.6411E−06 |
| A20 = | 0 | 0 | 0 | 0 | 0 | 0 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| Embodiment 10 | | | |
|---|---|---|---|
| Fno | 2.4 | ET56 | 0.56 |
| FOV | 100.1 | V6/V4 | 0.42 |
| f/f5 | 1.67 | SL2/TL2 | 0.45 |
| (R6 + R5)/(R6 − R5) | −0.70 | TTL/ImgH | 1.70 |
| tan(HFOV) | 1.19 | R10/f | −0.32 |
| (CT4 + CT5)/f | 0.56 | CT5 has the thickest thickness | Yes |
| (CT2 + T23 + CT3)/TTL | 0.18 | T45 > T34 > T56 | Yes |

Figure 11A:
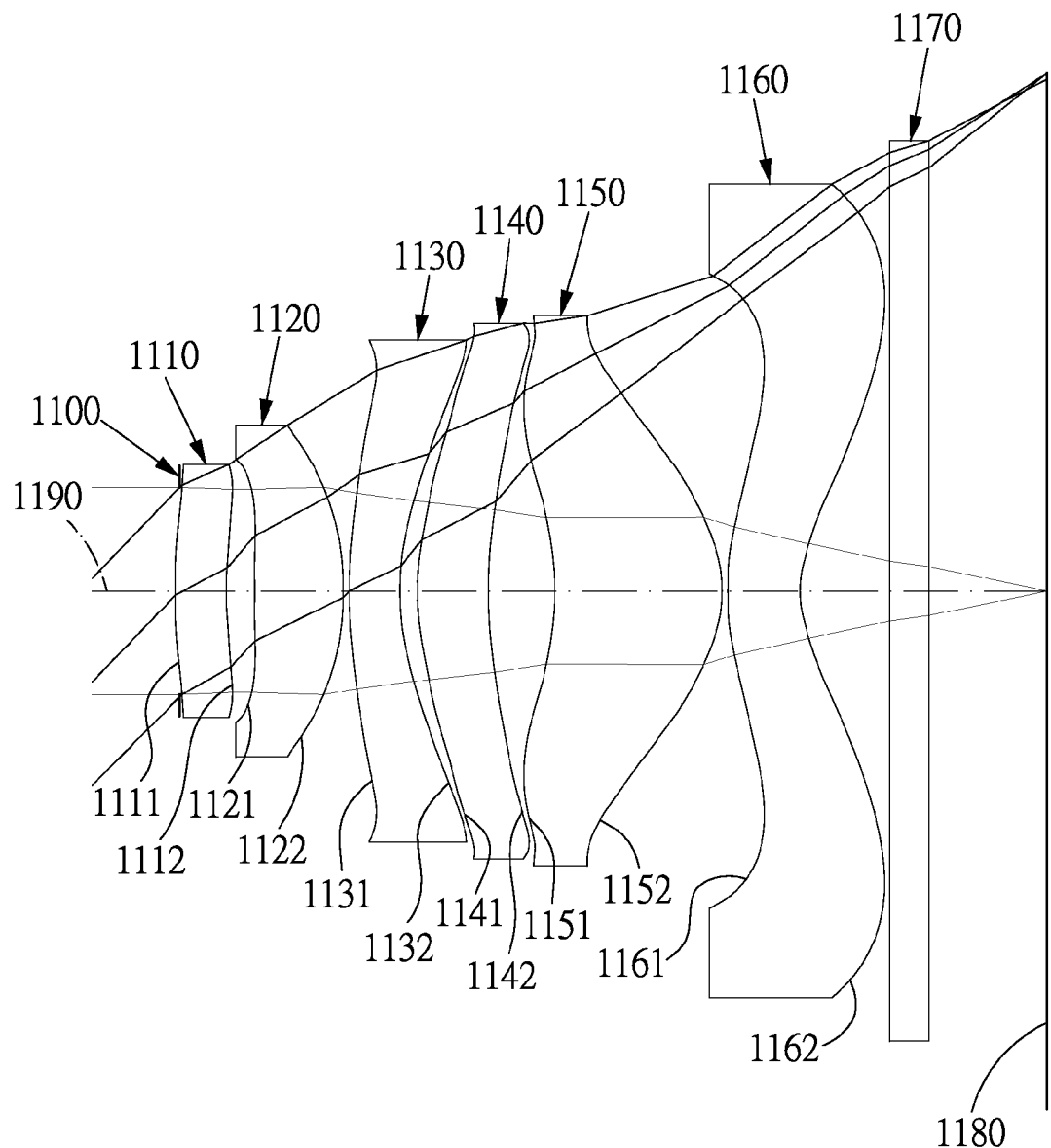
FIG. 11A shows a wide angle optical lens system in accordance with an eleventh embodiment of the present invention.
Figure 11B:
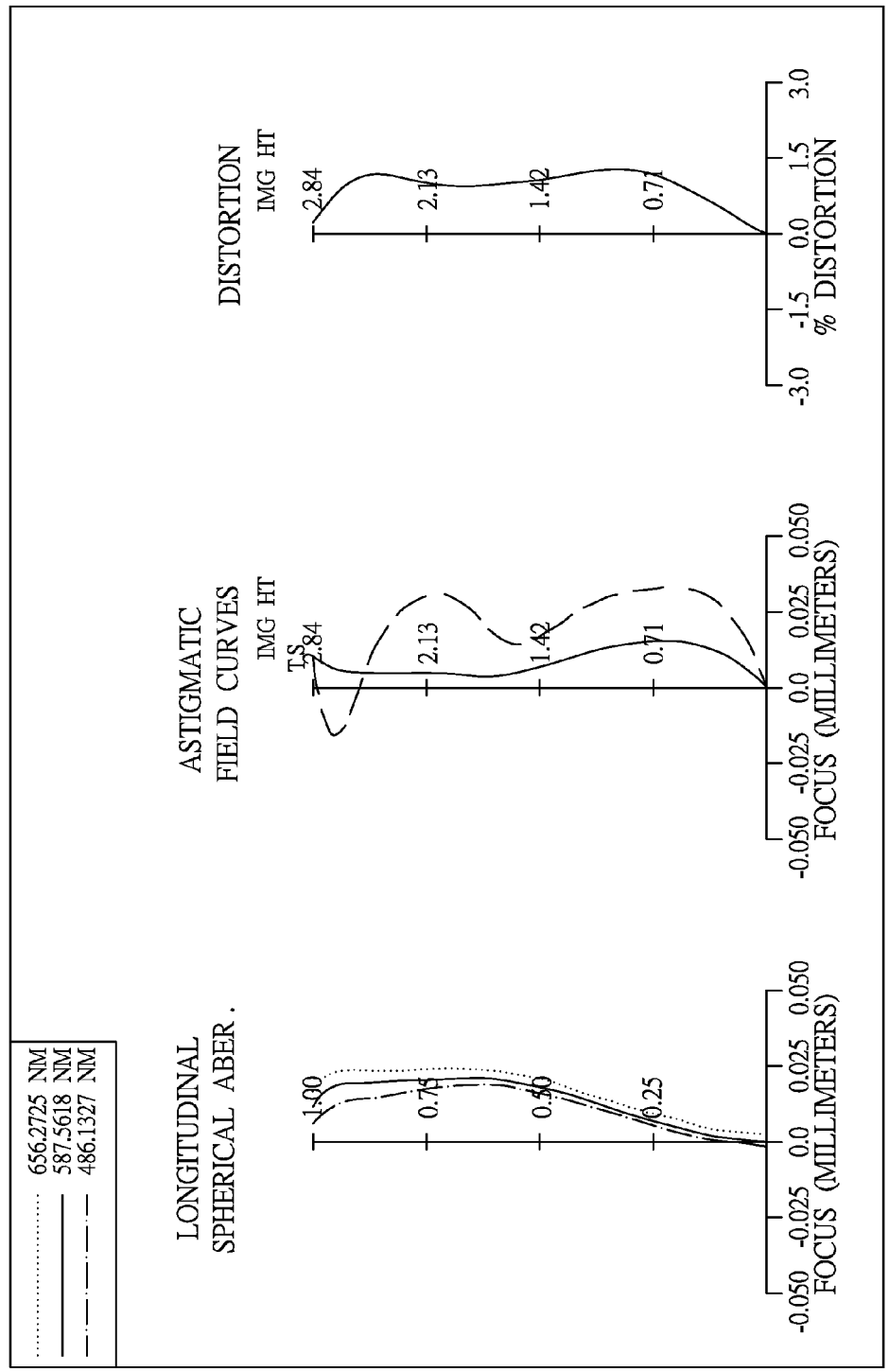
FIG. 11B shows the longitudinal spherical aberration curve, the astigmatic field curve and the distortion curve of the eleventh embodiment of the present invention.

FIG. 11A shows a wide angle optical lens system in accordance with a eleventh embodiment of the present invention, and FIG. 11B shows, in order from left to right, the longitudinal spherical aberration curves, the astigmatic field curves, and the distortion curve of the eleventh embodiment of the present invention. A wide angle optical lens system in accordance with the eleventh embodiment of the present invention comprises an aperture stop 1100 and an optical assembly. The optical assembly comprises, in order from an object side to an image side: a first lens element 1110, a second lens element 1120, a third lens element 1130, a fourth lens element 1140, a fifth lens element 1150, a sixth lens element 1160, an IR cut filter 1170 and an image plane 1180, wherein the wide angle optical lens system has a total of six lens elements with refractive power. The aperture stop 1100 is located between an object to be photographed and an image-side surface 1112 of the first lens element 1110.

The first lens element 1110 with a negative refractive power has an object-side surface 1111 being convex near an optical axis 1190 and the image-side surface 1112 being concave near the optical axis 1190, both the object-side and image-side surfaces 1111, 1112 are aspheric, and the first lens element 1110 is made of plastic material.

The second lens element 1120 with a positive refractive power has an object-side surface 1121 being concave near the optical axis 1190 and an image-side surface 1122 being convex near the optical axis 1190, both the object-side and image-side surfaces 1121, 1122 are aspheric, and the second lens element 1120 is made of plastic material.

The third lens element 1130 with a negative refractive power has an object-side surface 1131 being convex near the optical axis 1190 and an image-side surface 1132 being concave near the optical axis 1190, both the object-side and image-side surfaces 1131, 1132 are aspheric, and the third lens element 1130 is made of plastic material.

The fourth lens element 1140 with a positive refractive power has an object-side surface 1141 being convex near the optical axis 1190 and an image-side surface 1142 being concave near the optical axis 1190, both the object-side and image-side surfaces 1141, 1142 are aspheric, and the fourth lens element 1140 is made of plastic material.

The fifth lens element 1150 with a positive refractive power has an object-side surface 1151 being concave near the optical axis 1190 and an image-side surface 1152 being convex near the optical axis 1190, both the object-side and image-side surfaces 1151, 1152 are aspheric, and the fifth lens element 1150 is made of plastic material.

The sixth lens element 1160 with a negative refractive power has an object-side surface 1161 being convex near the optical axis 1190 and an image-side surface 1162 being concave near the optical axis 1190, both the object-side and image-side surfaces 1161, 1162 are aspheric, the sixth lens element 1160 is made of plastic material, and more than one inflection point is formed on the object-side surface 1161 and the image-side surface 1162 of the sixth lens element 1160.

The IR cut filter 1170 made of glass is located between the sixth lens element 1160 and the image plane 1180 and has no influence on the focal length of the wide angle optical lens system.

The detailed optical data of the eleventh embodiment is shown in Table 21 and the aspheric surface data is shown in Table 22 below.

TABLE 21

(Embodiment 11)
f(focal length) = 2.79 mm, Fno = 2.4, HFOV = 46.0 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.02 | | | | |
| 2 | Lens 1 | 3.6813(ASP) | 0.28 | Plastic | 1.546 | 55.9 | −50 |
| 3 | | 3.1579(ASP) | 0.160 | | | | |
| 4 | Lens 2 | −70.3013(ASP) | 0.48 | Plastic | 1.546 | 55.9 | 3.2098 |
| 5 | | −1.7199(ASP) | 0.03 | | | | |
| 6 | Lens 3 | 2.6852(ASP) | 0.28 | Plastic | 1.633 | 23.6 | −4.6223 |
| 7 | | 1.3512(ASP) | 0.10 | | | | |
| 8 | Lens 4 | 1.7294(ASP) | 0.39 | Plastic | 1.546 | 55.9 | 5.9122 |
| 9 | | 3.4119(ASP) | 0.36 | | | | |
| 10 | Lens 5 | −1.7429(ASP) | 0.92 | Plastic | 1.546 | 55.9 | 1.9769 |
| 11 | | −0.7929(ASP) | 0.03 | | | | |
| 12 | Lens 6 | 1.4011(ASP) | 0.40 | Plastic | 1.633 | 23.6 | −2.6574 |
| 13 | | 0.6823(ASP) | 0.49 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 22

Aspheric Coefficients

| Surface # | 2 | 3 | 4 | 5 | 6 | 7 |
|---|---|---|---|---|---|---|
| K = | −90.0000 | −33.8657 | 90.0000 | −4.6403 | −7.1399 | −5.8085 |
| A4 = | 1.2166E−01 | −1.1042E−02 | −1.3887E−01 | −2.1980E−01 | −1.3400E−01 | −4.1748E−02 |
| A6 = | −6.3207E−01 | −3.3346E−01 | −2.5308E−01 | 1.0759E−01 | 1.7046E−01 | 7.1172E−02 |
| A8 = | 1.0872E+00 | 1.1133E−01 | 4.3337E−01 | −6.9869E−02 | −1.0167E−01 | −4.3651E−02 |
| A10 = | 1.1053E−01 | −9.2665E−01 | −3.1687E+00 | −1.0092E−01 | 4.0957E−02 | −9.8892E−04 |
| A12 = | −5.7900E+00 | 2.1469E+00 | 7.3902E+00 | 2.8414E−01 | −1.5241E−02 | 1.2059E−02 |
| A14 = | 7.8713E+00 | −3.4406E+00 | −7.8922E+00 | −1.4431E−01 | 1.9989E−03 | −3.9781E−03 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −8.2357 | −0.7531 | −1.6801 | −2.1986 | −11.9824 | −4.2906 |
| A4 = | −3.2047E−02 | −5.1149E−02 | −6.5468E−03 | −4.8441E−02 | −7.0908E−03 | −5.6924E−02 |
| A6 = | 5.1380E−02 | 6.2160E−02 | 1.7413E−01 | 1.8596E−02 | 1.6626E−05 | 1.7686E−02 |
| A8 = | −5.6675E−02 | −2.5535E−02 | −5.2028E−02 | 1.1806E−02 | −3.6964E−02 | −5.3264E−03 |
| A10 = | 2.0425E−02 | −2.0672E−02 | −2.3075E−02 | −2.7238E−03 | 3.9239E−02 | 4.2169E−04 |
| A12 = | 5.7110E−03 | 2.2173E−02 | 4.6976E−03 | 6.2379E−04 | −2.0700E−02 | 1.8699E−04 |
| A14 = | −3.3008E−03 | −5.6082E−03 | 7.1685E−03 | −6.8919E−05 | 5.6013E−03 | −5.3601E−05 |
| A16 = | 0 | 0 | −2.3432E−03 | 1.8213E−04 | −6.5512E−04 | 4.9857E−06 |
| A18 = | 0 | 0 | 0 | 0 | 9.4575E−06 | −1.6400E−07 |
| A20 = | 0 | 0 | 0 | 0 | 0 | 0 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| Embodiment 11 | | | |
|---|---|---|---|
| Fno | 2.4 | ET56 | 0.69 |
| FOV | 92.0 | V6/V4 | 0.42 |
| f/f5 | 1.41 | SL2/TL2 | 0.98 |
| (R6 + R5)/(R6 − R5) | −3.03 | TTL/ImgH | 1.68 |
| tan(HFOV) | 1.04 | R10/f | −0.28 |
| (CT4 + CT5)/f | 0.47 | CT5 has the thickest thickness | Yes |
| (CT2 + T23 + CT3)/TTL | 0.17 | T45 > T34 > T56 | Yes |

Figure 12A:
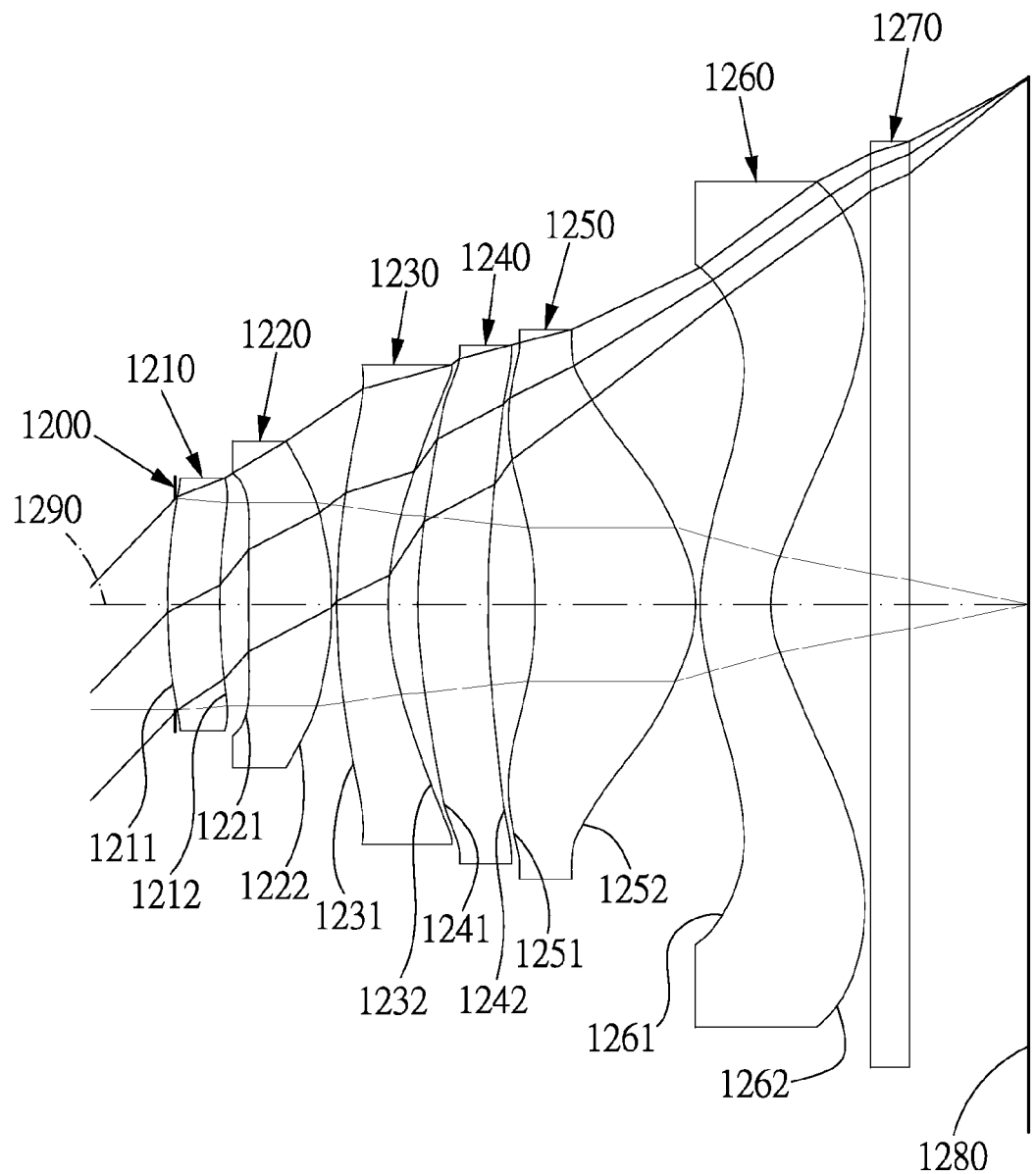
FIG. 12A shows a wide angle optical lens system in accordance with a twelfth embodiment of the present invention.
Figure 12B:
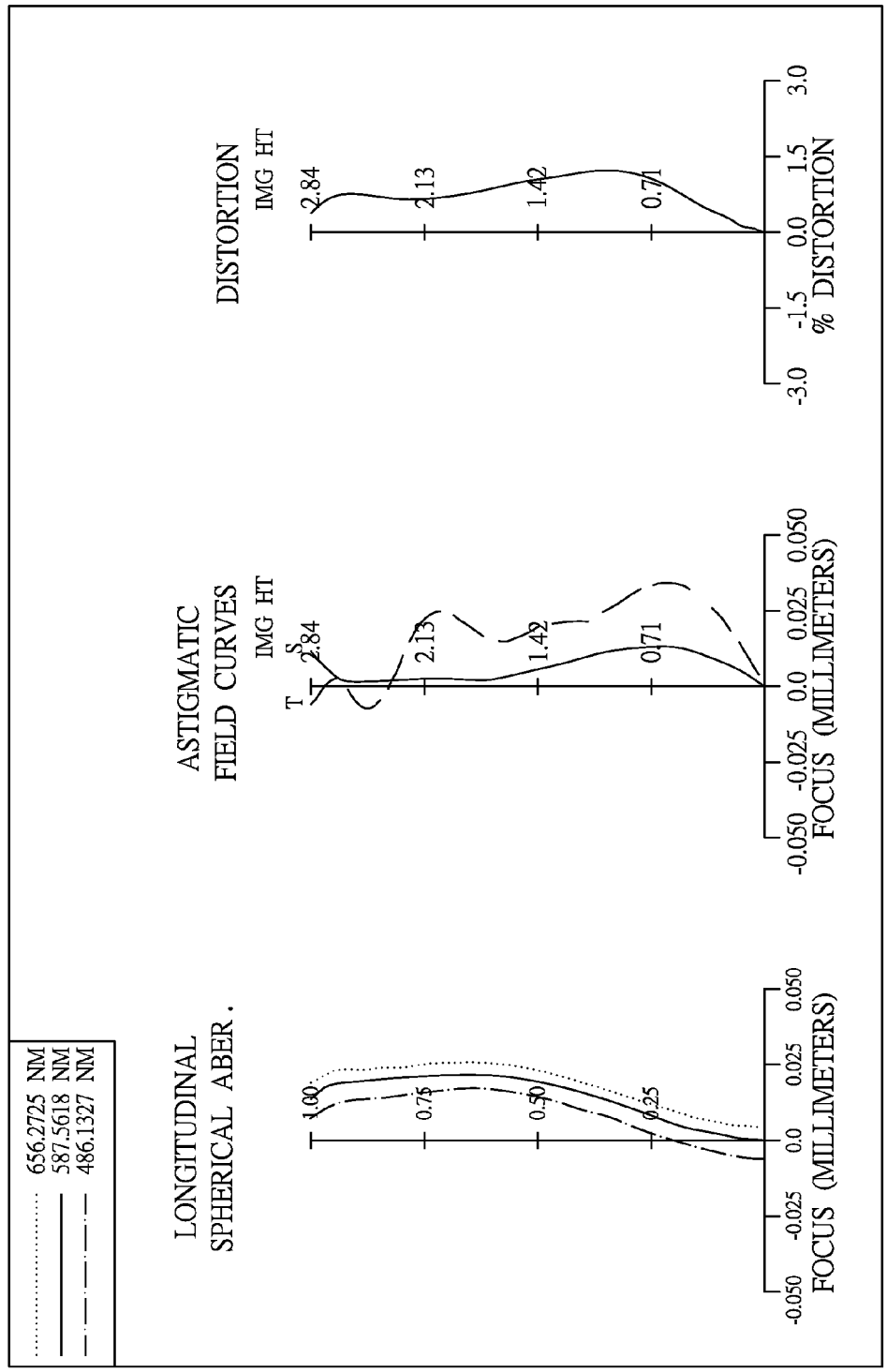
FIG. 12B shows the longitudinal spherical aberration curve, the astigmatic field curve and the distortion curve of the twelfth embodiment of the present invention.

FIG. 12A shows a wide angle optical lens system in accordance with a twelfth embodiment of the present invention, and FIG. 12B shows, in order from left to right, the longitudinal spherical aberration curves, the astigmatic field curves, and the distortion curve of the twelfth embodiment of the present invention. A wide angle optical lens system in accordance with the twelfth embodiment of the present invention comprises an aperture stop 1200 and an optical assembly. The optical assembly comprises, in order from an object side to an image side: a first lens element 1210, a second lens element 1220, a third lens element 1230, a fourth lens element 1240, a fifth lens element 1250, a sixth lens element 1260, an IR cut filter 1270 and an image plane 1280, wherein the wide angle optical lens system has a total of six lens elements with refractive power. The aperture stop 1200 is located between an object to be photographed and an image-side surface 1212 of the first lens element 1210.

The first lens element 1210 with a negative refractive power has an object-side surface 1211 being convex near an optical axis 1290 and the image-side surface 1212 being concave near the optical axis 1290, both the object-side and image-side surfaces 1211, 1212 are aspheric, and the first lens element 1210 is made of plastic material.

The second lens element 1220 with a positive refractive power has an object-side surface 1221 being convex near the optical axis 1290 and an image-side surface 1222 being convex near the optical axis 1290, both the object-side and image-side surfaces 1221, 1222 are aspheric, and the second lens element 1220 is made of plastic material.

The third lens element 1230 with a negative refractive power has an object-side surface 1231 being convex near the optical axis 1290 and an image-side surface 1232 being concave near the optical axis 1290, both the object-side and image-side surfaces 1231, 1232 are aspheric, and the third lens element 1230 is made of plastic material.

The fourth lens element 1240 with a positive refractive power has an object-side surface 1241 being convex near the optical axis 1290 and an image-side surface 1242 being concave near the optical axis 1290, both the object-side and image-side surfaces 1241, 1242 are aspheric, and the fourth lens element 1240 is made of plastic material.

The fifth lens element 1250 with a positive refractive power has an object-side surface 1251 being concave near the optical axis 1290 and an image-side surface 1252 being convex near the optical axis 1290, both the object-side and image-side surfaces 1251, 1252 are aspheric, and the fifth lens element 1250 is made of plastic material.

The sixth lens element 1260 with a negative refractive power has an object-side surface 1261 being convex near the optical axis 1290 and an image-side surface 1262 being concave near the optical axis 1290, both the object-side and image-side surfaces 1261, 1262 are aspheric, the sixth lens element 1260 is made of plastic material, and more than one inflection point is formed on the object-side surface 1261 and the image-side surface 1262 of the sixth lens element 1260.

The IR cut filter 1270 made of glass is located between the sixth lens element 1260 and the image plane 1280 and has no influence on the focal length of the wide angle optical lens system.

The detailed optical data of the twelfth embodiment is shown in Table 23 and the aspheric surface data is shown in Table 24 below.

TABLE 23

(Embodiment 12)
f(focal length) = 2.79 mm, Fno = 2.4, HFOV = 46.0 deg.

| Surface | | Curvature Radius | Thickness | Material | index | Abbe # | Focal length |
|---|---|---|---|---|---|---|---|
| 0 | Object | Plane | Infinity | | | | |
| 1 | Aperture stop | Plane | −0.04 | | | | |
| 2 | Lens 1 | 2.6587(ASP) | 0.28 | Plastic | 1.546 | 55.9 | −350.0338 |
| 3 | | 2.5246(ASP) | 0.160 | | | | |
| 4 | Lens 2 | 12.0000(ASP) | 0.45 | Plastic | 1.546 | 55.9 | 3.4164 |
| 5 | | −2.1886(ASP) | 0.03 | | | | |
| 6 | Lens 3 | 2.7415(ASP) | 0.28 | Plastic | 1.633 | 23.6 | −5.4538 |
| 7 | | 1.4752(ASP) | 0.16 | | | | |
| 8 | Lens 4 | 2.5497(ASP) | 0.38 | Plastic | 1.546 | 55.9 | 9.8272 |
| 9 | | 4.5873(ASP) | 0.26 | | | | |
| 10 | Lens 5 | −2.1320(ASP) | 0.86 | Plastic | 1.546 | 55.9 | 1.9623 |
| 11 | | −0.8170(ASP) | 0.03 | | | | |
| 12 | Lens 6 | 1.2398(ASP) | 0.38 | Plastic | 1.633 | 23.6 | −2.7373 |
| 13 | | 0.6393(ASP) | 0.54 | | | | |
| 14 | IR-filter | Plane | 0.21 | Glass | 1.517 | 64.0 | — |
| 15 | | Plane | 0.65 | | | | |
| 16 | Image | Plane | — | | | | |

TABLE 24

Aspheric Coefficients

| Surface # | 2 | 3 | 4 | 5 | 6 | 7 |
|---|---|---|---|---|---|---|
| K = | −46.5902 | −13.6237 | 22.0552 | 4.2849 | −13.6209 | −5.8436 |
| A4 = | 2.2529E−01 | −2.9434E−02 | −1.5013E−01 | −8.8502E−02 | −1.1848E−01 | −2.8389E−02 |
| A6 = | −7.7608E−01 | −2.2223E−01 | −3.4426E−01 | 7.8725E−02 | 1.7691E−01 | 6.0695E−02 |
| A8 = | 1.4576E+00 | −4.8024E−01 | 7.3690E−01 | 9.1216E−02 | −1.0528E−01 | −4.4138E−02 |
| A10 = | −9.7685E−01 | −5.0906E−01 | −3.4191E−01 | −1.4634E−01 | 3.9271E−02 | 2.6349E−03 |
| A12 = | −3.0131E+00 | 9.0537E−01 | 6.6624E+00 | 7.5652E−02 | −1.5076E−02 | 1.3406E−02 |
| A14 = | 5.0312E+00 | −2.1434E+00 | −6.9964E+00 | 1.5662E−01 | 2.1019E−03 | −5.4359E−03 |
| A16 = | 0 | 0 | 0 | 0 | 0 | 0 |
| A18 = | 0 | 0 | 0 | 0 | 0 | 0 |
| A20 = | 0 | 0 | 0 | 0 | 0 | 0 |

| Surface # | 8 | 9 | 10 | 11 | 12 | 13 |
|---|---|---|---|---|---|---|
| K = | −10.3669 | 8.3209 | 0.0292 | −2.1819 | −8.4809 | −3.7197 |
| A4 = | −6.9825E−02 | −9.2290E−02 | −9.9288E−03 | −5.0536E−02 | −3.0222E−02 | −6.4080E−02 |
| A6 = | 6.1849E−02 | 6.3833E−02 | 1.7402E−01 | 1.4738E−02 | 1.7293E−02 | 1.6518E−02 |
| A8 = | −4.4494E−02 | −2.0499E−02 | −4.7510E−02 | 1.3221E−02 | −4.6863E−02 | −3.0437E−03 |
| A10 = | 2.2725E−02 | −1.9791E−02 | −2.2125E−02 | −4.2778E−04 | 4.2215E−02 | −1.5026E−04 |
| A12 = | 4.3565E−03 | 2.1388E−02 | 4.5638E−03 | 1.5775E−03 | −2.0149E−02 | 1.9498E−04 |
| A14 = | −4.3146E−03 | −5.8968E−03 | 6.9240E−03 | −6.4649E−04 | 5.2897E−03 | −4.2489E−05 |
| A16 = | 0 | 0 | −2.3811E−03 | −8.6209E−05 | −7.0941E−04 | 4.7029E−06 |
| A18 = | 0 | 0 | 0 | 0 | 3.6318E−05 | −2.5300E−07 |
| A20 = | 0 | 0 | 0 | 0 | 0 | 0 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| Embodiment 12 | | | |
|---|---|---|---|
| Fno | 2.4 | ET56 | 0.69 |
| FOV | 92.0 | V6/V4 | 0.42 |
| f/f5 | 1.42 | SL2/TL2 | 0.95 |
| (R6 + R5)/(R6 − R5) | −3.33 | TTL/ImgH | 1.63 |
| tan(HFOV) | 1.04 | R10/f | −0.29 |
| (CT4 + CT5)/f | 0.45 | CT5 has the thickest thickness | Yes |
| (CT2 + T23 + CT3)/TTL | 0.16 | T45 > T34 > T56 | Yes |

In the present wide angle optical lens system, the lens elements can be made of plastic or glass. If the lens elements are made of plastic, the cost will be effectively reduced. If the lens elements are made of glass, there is more freedom in distributing the refractive power of the wide angle optical lens system. Plastic lens elements can have aspheric surfaces, which allow more design parameter freedom (than spherical surfaces), so as to reduce the aberration and the number of the lens elements, as well as the total track length of the wide angle optical lens system.

In the present wide angle optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The wide angle optical lens system of the present invention can be used in focusing optical systems and can obtain better image quality. The wide angle optical lens system of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

While we have shown and described various embodiments in accordance with the present invention, it should be clear to those skilled in the art that further embodiments may be made without departing from the scope of the present invention.

What is claimed is:

1. A wide angle optical lens system comprising an aperture stop and an optical assembly, the optical assembly comprising: in order from an object side to an image side:

a first lens element with a negative refractive power having an aspheric object-side surface and an aspheric image-side surface, the first lens element being made of plastic material;

a second lens element with a positive refractive power having an aspheric object-side surface and an aspheric image-side surface being convex near an optical axis;

a third lens element with a negative refractive power having an aspheric object-side surface and an aspheric image-side surface being concave near an optical axis, the third lens element being made of plastic material;

a fourth lens element with a refractive power having an aspheric object-side surface being convex near an optical axis and an aspheric image-side surface, the fourth lens element being made of plastic material;

a fifth lens element with a positive refractive power having an aspheric object-side surface and an aspheric image-side surface being convex near an optical axis, the fifth lens element being made of plastic material;

a sixth lens element with a negative refractive power having an aspheric object-side surface being convex near an optical axis and an aspheric image-side surface being concave near an optical axis, the sixth lens element being made of plastic material, more than one inflection point being formed on the object-side and image-side surfaces of the sixth lens element;

wherein a focal length of the wide angle optical lens system is f, a focal length of the fifth lens element is f5, a radius of curvature of the object-side surface of the third lens element is R5, a radius of curvature of the image-side surface of the third lens element is R6, half of the maximal field of view of the wide angle optical lens system is HFOV, a central thickness of the fourth lens element is CT4, a central thickness of the fifth lens element is CT5, the focal length of the wide angle optical lens system is f, and the following conditions are satisfied:

$1.0 < f/f5 < 3.8$;

$-3.5 < (R6+R5)/(R6-R5) < 0.6$;

$0.7 < \tan(HFOV) < 1.3$;

$0.38 < (CT4+CT5)/f < 0.72$.

2. The wide angle optical lens system as claimed in claim 1, wherein a central thickness of the second lens element is CT2, a central thickness of the third lens element is CT3, a distance along the optical axis between the second lens element and the third lens element is T23, a distance from the object-side surface of the first lens element to an image plane along the optical axis is TTL, and the following condition is satisfied:

$0.16 < (CT2+T23+CT3)/TTL < 0.24$.

3. The wide angle optical lens system as claimed in claim 1, wherein the object-side surface of the first lens element is convex near an optical axis.

4. The wide angle optical lens system as claimed in claim 3, wherein a parallel distance from a point between a position of the maximum effective diameter of the image-side surface of the fifth lens element and a position of the maximum effective diameter of the object-side surface of the sixth lens element to the optical axis is ET56, and the following condition is satisfied:

$0.26 < ET56 < 0.83$.

5. The wide angle optical lens system as claimed in claim 4, wherein an Abbe number of the fourth lens element is V4, an Abbe number of the sixth lens element is V6, and the following condition is satisfied:

$0.27 < V6/V4 < 0.7$.

6. The wide angle optical lens system as claimed in claim 1, wherein a distance from the aperture stop to the image-side surface of the second lens element along the optical axis is SL2, a distance from the object-side surface of the first lens element to the image-side surface of the second lens element along the optical axis is TL2, and the following condition is satisfied:

$0.3 < SL2/TL2 < 1.1$.

7. The wide angle optical lens system as claimed in claim 1, wherein a distance from the object-side surface of the first lens element to an image plane along the optical axis is TTL, half of the maximum diagonal imaging height of the wide angle optical lens system is ImgH, and the following condition is satisfied:

$TTL/ImgH < 1.85$.

8. A wide angle optical lens system comprising an aperture stop and an optical assembly, the optical assembly comprising: in order from an object side to an image side:

a first lens element with a negative refractive power having an aspheric object-side surface being convex near an optical axis and an aspheric image-side surface, the first lens element being made of plastic material;

a second lens element with a positive refractive power having an aspheric object-side surface being convex near an optical axis and an aspheric image-side surface being convex near an optical axis;

a third lens element with a negative refractive power having an aspheric object-side surface and an aspheric image-side surface being concave near an optical axis, the third lens element being made of plastic material;

a fourth lens element with a refractive power having an aspheric object-side surface being convex near an optical axis and an aspheric image-side surface, the fourth lens element being made of plastic material;

a fifth lens element with a positive refractive power having an aspheric object-side surface and an aspheric image-side surface being convex near an optical axis, the fifth lens element being made of plastic material;

a sixth lens element with a negative refractive power having an aspheric object-side surface being convex near an optical axis and an aspheric image-side surface being concave near an optical axis, the sixth lens element being made of plastic material, more than one inflection point being formed on the object-side and image-side surfaces of the sixth lens element;

wherein a focal length of the wide angle optical lens system is f, a focal length of the fifth lens element is f5, a distance along the optical axis between the third lens element and the fourth lens element is T34, a distance along the optical axis between the fourth lens element and the fifth lens element is T45, a distance along the optical axis between the fifth lens element and the sixth lens element is T56, a distance from the aperture stop to the image-side surface of the second lens element along the optical axis is SL2, a distance from the object-side surface of the first lens element to the image-side surface of the second lens element along the optical axis is TL2, and the following conditions are satisfied:

$1.2 < f/f5 < 3.8$;

$T45 > T34 > T56$;

$0.35 < SL2/TL2 < 1.0$.

9. The wide angle optical lens system as claimed in claim 8, wherein a radius of curvature of the object-side surface of the third lens element is R5, a radius of curvature of the image-side surface of the third lens element is R6, and the following condition is satisfied:

$-3.2 < (R6+R5)/(R6-R5) < 0.6$.

10. The wide angle optical lens system as claimed in claim 9, wherein a central thickness of the second lens element is CT2, a central thickness of the third lens element is CT3, a distance along the optical axis between the second lens element and the third lens element is T23, a distance from the object-side surface of the first lens element to an image plane along the optical axis is TTL, and the following condition is satisfied:

$0.18 < (CT2+T23+CT3)/TTL < 0.22$.

11. The wide angle optical lens system as claimed in claim 8, wherein the image-side surface of the first lens element is concave near an optical axis, and the object-side surface of the fifth lens element is concave near an optical axis.

12. The wide angle optical lens system as claimed in claim 11, wherein the focal length of the wide angle optical lens system is f, the focal length of the fifth lens element is f5, and the following condition is satisfied:

$1.2 < f/f5 < 3.2.$

13. The wide angle optical lens system as claimed in claim 12, wherein the focal length of the wide angle optical lens system is f, a radius of curvature of the image-side surface of the fifth lens element is R10, and the following condition is satisfied:

$-0.45 < R10/f < -0.05.$

14. The wide angle optical lens system as claimed in claim 8, wherein a central thickness of the fifth lens element is CT5, which has the thickest thickness among the central thicknesses of the first to sixth lens elements.

15. The wide angle optical lens system as claimed in claim 8, wherein a distance from the object-side surface of the first lens element to an image plane along the optical axis is TTL, half of the maximum diagonal imaging height of the wide angle optical lens system is ImgH, and the following condition is satisfied:

$TTL/ImgH < 1.85.$

* * * * *